United States Patent
Hazan

(10) Patent No.: US 8,640,593 B2
(45) Date of Patent: Feb. 4, 2014

(54) DAMPING SUSPENSION WITH AN UP-LIFT CAPABILITY FOR AN ADD-ON ARMOR SYSTEM

(75) Inventor: Gil Hazan, Nofit (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 0 days.

(21) Appl. No.: 13/145,554

(22) PCT Filed: Jan. 20, 2010

(86) PCT No.: PCT/IL2010/000052
§ 371 (c)(1),
(2), (4) Date: Sep. 29, 2011

(87) PCT Pub. No.: WO2010/084491
PCT Pub. Date: Jul. 29, 2010

(65) Prior Publication Data
US 2012/0097020 A1   Apr. 26, 2012

(30) Foreign Application Priority Data

Jan. 21, 2009  (IL) .......................................... 196637
Sep. 24, 2009  (IL) .......................................... 201180

(51) Int. Cl.
*F41H 7/04* (2006.01)
*F41H 5/013* (2006.01)

(52) U.S. Cl.
USPC ........... 89/36.08; 89/36.07; 89/36.01; 89/918

(58) Field of Classification Search
USPC ............ 89/36.01, 36.02, 36.07, 36.08, 36.09; 105/394; 280/762, 770; 305/107, 110
See application file for complete search history.

(56) References Cited

U.S. PATENT DOCUMENTS

| | | | | |
|---|---|---|---|---|
| 1,287,845 A * | 12/1918 | Bidwell | ............................ | 180/9 |
| 2,625,859 A | 1/1953 | Dandini | | |
| 2,871,763 A * | 2/1959 | Blomquist | ................... | 89/36.08 |
| 3,139,797 A * | 7/1964 | Fair et al. | ..................... | 89/36.08 |
| 3,776,094 A * | 12/1973 | Gilles et al. | .................. | 89/36.02 |
| 3,983,832 A * | 10/1976 | Kinder | ....................... | 440/12.63 |
| 4,190,227 A * | 2/1980 | Belfield et al. | ............... | 248/636 |
| 4,458,955 A | 7/1984 | Webb | | |
| 4,524,674 A * | 6/1985 | Gilvydis | ..................... | 89/36.08 |

(Continued)

FOREIGN PATENT DOCUMENTS

EP  0059143  3/1986

OTHER PUBLICATIONS

Liftup by Profil-Import AB (http://www.profil-import.se/liftup.pdf) (Jan. 21, 2009).

(Continued)

*Primary Examiner* — Bret Hayes
*Assistant Examiner* — Derrick Morgan
(74) *Attorney, Agent, or Firm* — Rodney J. Fuller; Booth Udall Fuller, PLC

(57) ABSTRACT

A damping suspension for an add-on armor system of an ACV (Armored Combat Vehicle), comprises mounting means for mounting said add-on armor system to an ACV; and damping means coupled to said mounting means and to said add-on armor system's armor means, in order to damp vibrations and restrain shocks unto which said armor means might be exposed as an outcome of said ACV's travel; and wherein said damping suspension is characterized by that said damping suspension includes a device of the 'wire rope isolator' type.

12 Claims, 23 Drawing Sheets

(56) References Cited

U.S. PATENT DOCUMENTS

Figure 1:
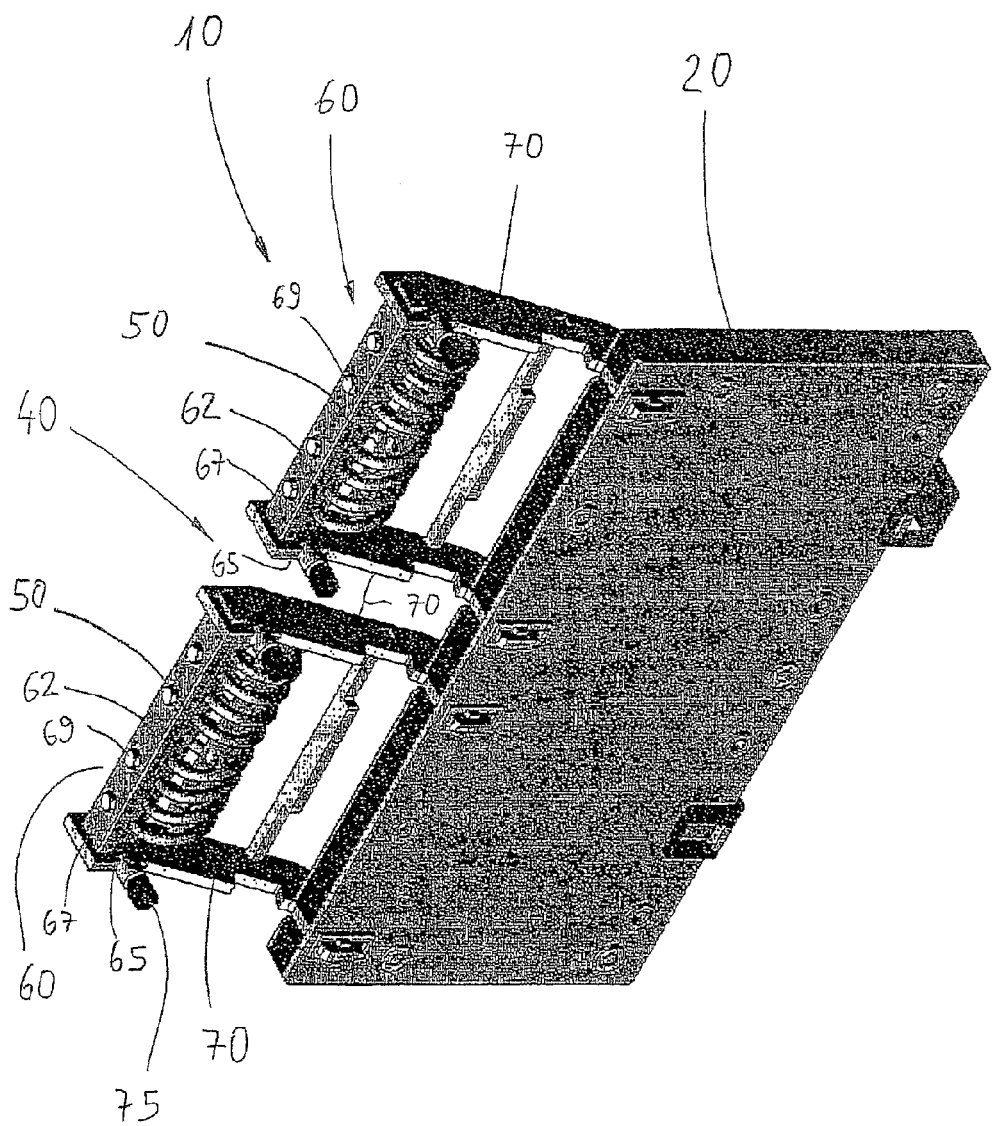

| | | | |
|---|---|---|---|
| 4,741,244 A * | 5/1988 | Ratner et al. | 89/36.17 |
| 5,113,779 A * | 5/1992 | Amrein et al. | 440/12.63 |
| 5,398,592 A * | 3/1995 | Turner | 89/36.08 |
| 5,549,285 A * | 8/1996 | Collins | 267/148 |
| 5,625,160 A * | 4/1997 | Rudolf et al. | 89/36.17 |
| 5,897,093 A | 4/1999 | Le Derf | |
| 6,082,240 A * | 7/2000 | Middione et al. | 89/36.08 |
| 6,290,217 B1 | 9/2001 | Schneider | |
| 6,406,011 B1 | 6/2002 | Kosar | |
| 6,942,263 B2 * | 9/2005 | Welch et al. | 293/133 |
| 7,458,306 B2 * | 12/2008 | Singh et al. | 89/36.02 |
| 8,006,606 B1 * | 8/2011 | Petrosillo et al. | 89/36.07 |
| 2003/0172863 A1 * | 9/2003 | Brown | 114/123 |
| 2007/0017360 A1 * | 1/2007 | Cohen | 89/36.08 |
| 2010/0282061 A1 * | 11/2010 | Peretz | 89/36.02 |
| 2011/0132183 A1 * | 6/2011 | Adam et al. | 89/36.02 |
| 2012/0183716 A1 * | 7/2012 | Jordan et al. | 428/47 |

OTHER PUBLICATIONS

Supplementary for Liftup (figure 10) (http://www.socitec.com/vente-amortisseur-gb.html) (retrieved Sep. 9, 2009).

Wire rope isolators (figure 3) (Jan. 6, 2005).

* cited by examiner

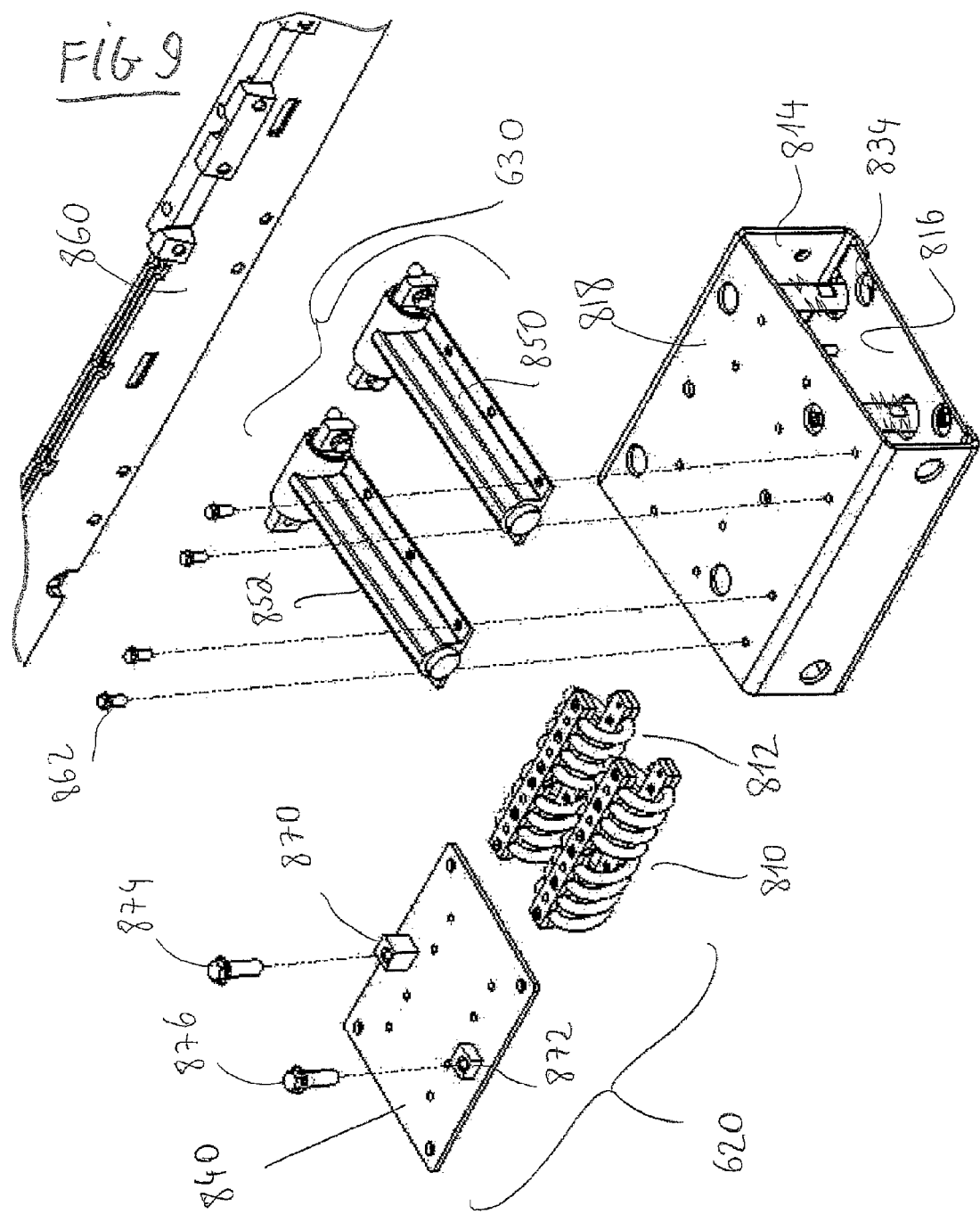

Lift up 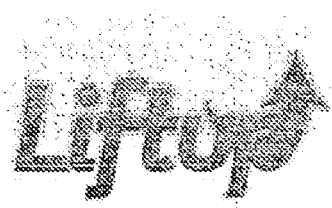 (Prior Art)
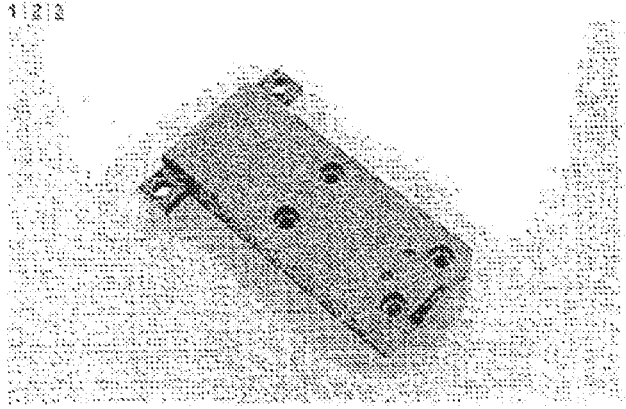

Lift up FIG 10 cont. (Prior Art)

Change Language:
English | Swedish | French | German

Typical applications
- Commercial vehicles
- Transportation containers
- Military vehicles Information
- Technical Info(pdf)
- Additional info(small)

Contact us for further information on Lift up

Lift up

The revolutionary disc spring-operated hinges that replace conventional hinges and gas struts and that work in all weathers and temperatures.

Military vehicles
ALU 25 C | SEE

1 | 2 | 3

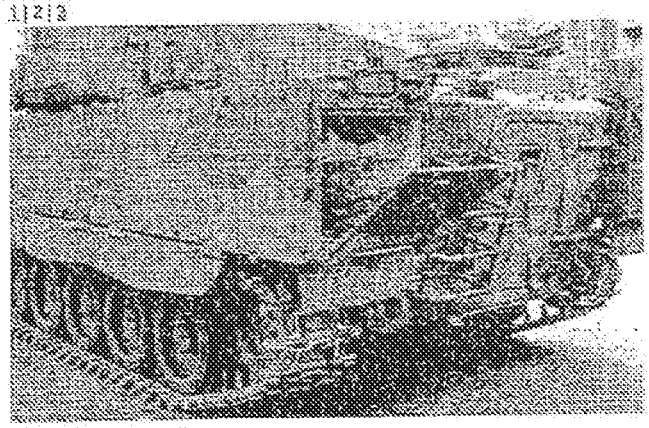

FIG. 10 cont. (Prior Art)
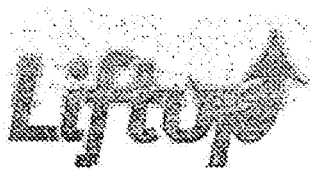
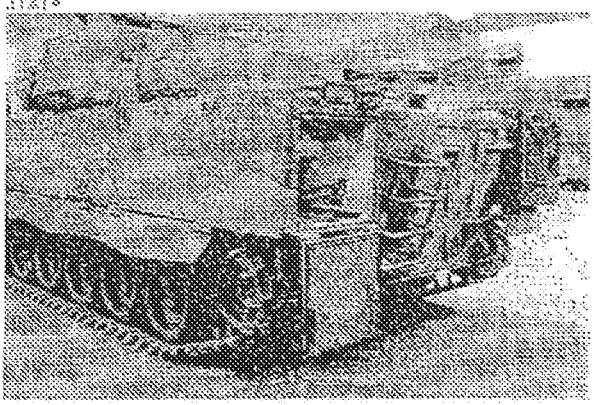

FIG. 10 cont. (Prior Art)

1. LIFT UP - DATA a. Range
b. Size specification, Type 180 double-acting
c. Size specification, Type 360 double-acting
d. Size specification, Type 360 single-acting
e. Size specification, Type ALU 25 double acting
f. Size specification, aluminium profile
g. Sketch - rubber sealing strip
h. Disc springs - grouping (4 pages)
i. End caps, left and right
j. Punching tool for notching the rubber sealing strip

2. INSTRUCTION FOR FITTING a. Instruction for mounting the hinges
b. Adjustment of the spring pressure
c. Positioning the aluminium profile

3. TEST REPORT

Please contact Profil-Import AB

4. MOVEMENT DIAGRAM a. Type 180 double-acting
b. Type 360 double-acting
c. Type 360 single-acting
d. Type ALU 25 double-acting
e. Calculation of movement - formula
f. Specification of moment for Lift Up

5. MARKETING NEWS a. Report from the fair
b. Advertisement

FIG 10 cont. (Prior Art)

LIFT UP – RANGE

LIFT UP – Lifting hinges

Standard movement, type 180 double acting for lift up flaps to about 700 mm height. Weight per flap according to movement diagram page 4a.

Type 360 double acting with increased lifting capacity for lift up flaps to about 1250 mm height. Weight per flap according to movement diagram 4b.

Type 360 single acting with increased lifting capacity for lift up ramps etc. Sizes and weight per ramp according to movement diagram 4c.

Type ALU 25 for light lift up flaps and for different types of transportation containers etc. Movement diagram for ALU 25 double acting page 4d.

LIFT UP – FITTINGS

Anodized aluminium profile, length 2600 mm to be mounted on the rear body-frame. In the profile, the rubber sealing strip is to be fitted and secured.

Anodized aluminium profile, length 2600 mm to be mounted on the lift up flap where the rubber sealing strip is to be fitted and secured.

Rubber sealing strip, of high quality (EPDM) weatherproof, length 2600 mm.

End caps left and right for optimum sealing at both ends of the lift up flap.

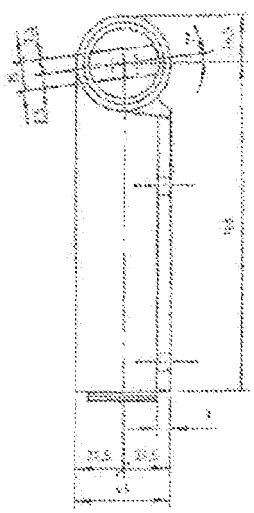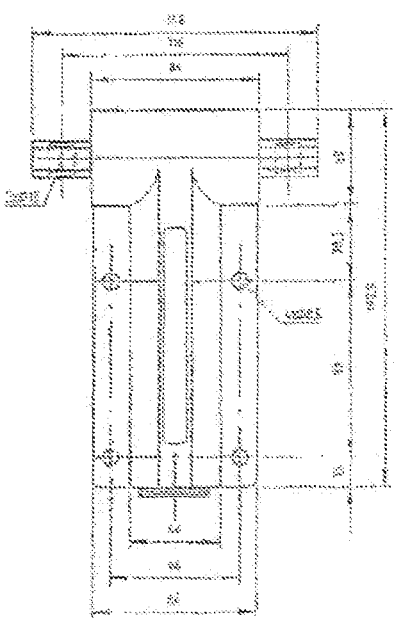
FIG. 10 cont. (Prior Art)

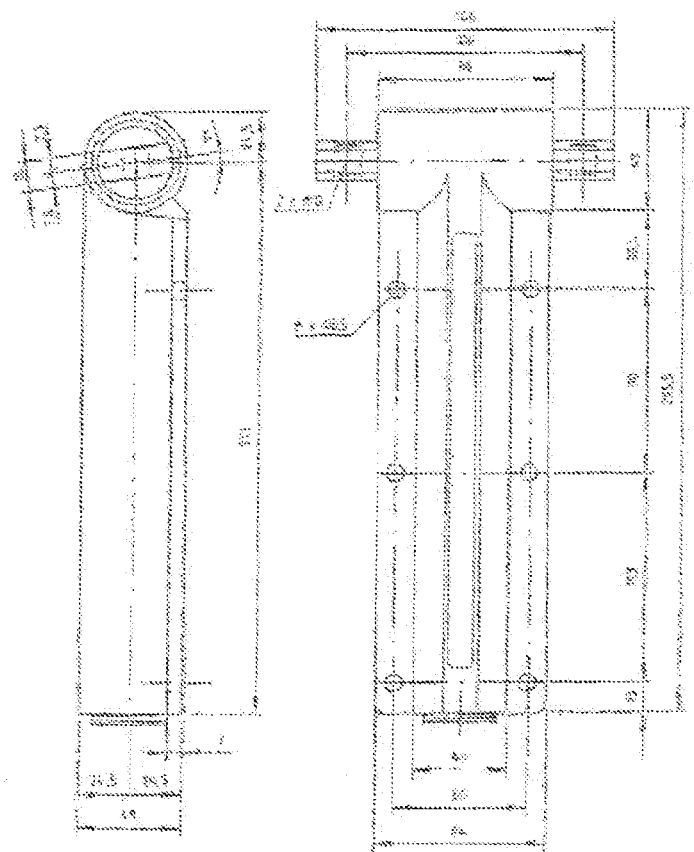
FIG 10 cont. (Prior Art)

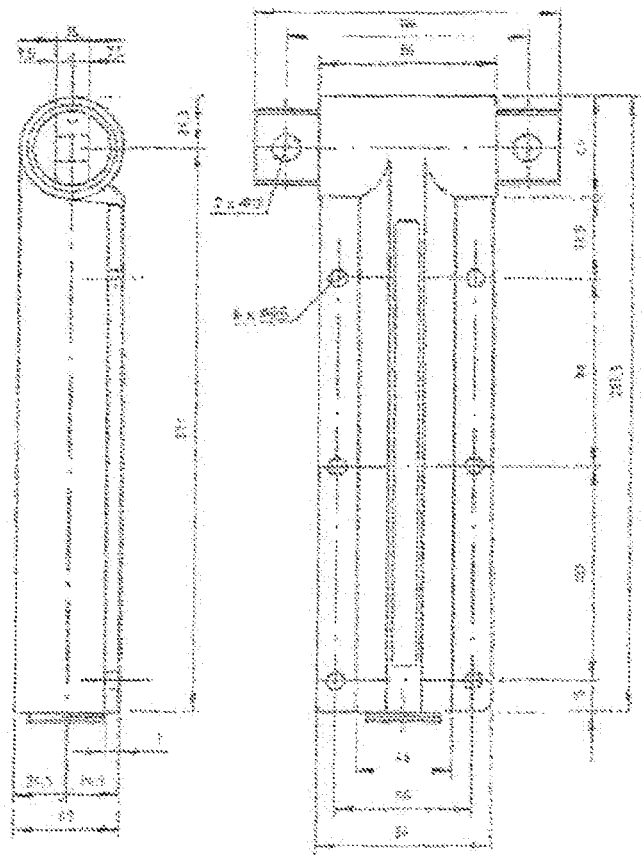
FIG 10 cont. (Prior Art)

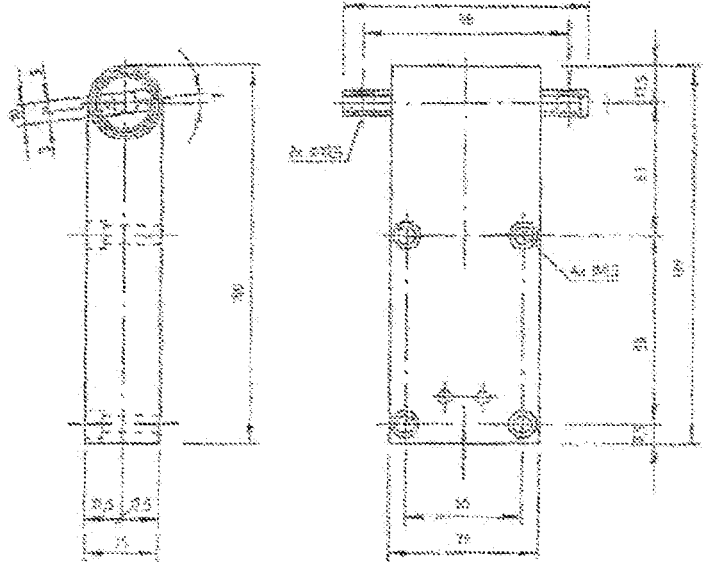
FIG. 10 cont. (Prior Art)

DAMPING SUSPENSION WITH AN UP-LIFT CAPABILITY FOR AN ADD-ON ARMOR SYSTEM

RELATED APPLICATION DATA

This application is the U.S. National Stage of PCT/IL2010/000052, filed Jan. 20, 2010, which claims the benefit of Israel Application Nos. 196637, filed Jan. 21, 2009, and 201180, filed Sep. 24, 2009, the contents of each of which are herein incorporated by reference for all purposes.

FIELD OF THE INVENTION

The present invention, the subject matter of this application, is found in the field of devices serving to mount an add-on armor on Armored Combat Vehicles (hereinafter—ACV's) in general, and in particular—within the variety of such devices as said, that damp vibrations and restrain shocks, and serve for mounting an add-on armor to protect the suspension area of a tracked ACV (e.g.—the area in which the tracked ACV's tracks, linkage, springs, wheel trucks (or "bogies"), rear drive sprocket and return rollers are located), (hereinafter—the tracked ACV's suspension system).

BACKGROUND OF THEN INVENTION

Restoring to the use of ACV's, namely a vehicle that is endowed with shielding for proper combat operations or as support in battles circumstances, is well known.

A common tracked ACV is an ACV that comprises a suspension system for tracks, for example—tanks, armored troops carriers, and self propelled guns and even heavy mechanical-engineering equipment, such as bulldozers and excavators.

A familiar and known threat that is dangerous to all ACV's including tracked ACV's with a suspension system, is the threat imposed by armament equipped with a warhead of the hollow or "shaped" type, or as known in another jargon common in this field, namely HEAT (High Explosive Anti Tank).

Armament equipped with a "hollow charge" type of warhead, includes a shaped formed explosives that from the instant of its detonation, exploits the Munroe effect. The Munroe effect describes partial focusing of blast energy caused by a hollow or void cut into a piece of explosive, and as said is exploited by the shaped or hollow charge. Explosive energy is released directly away from (i.e. normal to) the surface of the explosive so shaping the explosive would concentrate the explosive energy in the void. In consequence, a blazing (red-hot) jet of enormous velocity is generated, that is made of molten metal (that was melted by it unto a super elastic state). The molten metal is akin to a specific state of aggregation of the metal from which a thin shaped liner is composed, a liner that is positioned attached to the explosive. This jet is capable to pierce (and perforate) armor of rather considerable thickness and penetrate through it, up to six to ten times the diameter of the hollow charge.

It is important to note that warheads equipped with said hollow charges posses a Stand Off distance ("focusing" distance) that is defined by the manner they are shaped. Detonating the hollow charge not at the optimal distance required for its convergence into a piercing jet as explained, might disrupt and detract from the efficiency of the charge.

Therefore, already in the days of the Second World War, use was initiated of an add-on armor means to the ACV's. The idea was to implement mechanical devices—inert ones, for achieving early detonation and hence not optimal, of the hollow warheads.

These devices are known in their descriptive names, such as "bazooka plates", "side skirts", "fender skirts", "apron armor". We are talking about mechanical devices as said, inert ones, for example thin steel plates, nets, chains, grilles and the like, that serve as a buffer between the wall of the ACV to the flying warhead threat, and cause its early detonation at a distance, in a manner that reduces its penetration capability performance.

As time passed, in the early seventies of the preceding century, an additional add-on armor means has been developed, known as the "reactive armor". This is based on "tiles" of explosives "sandwiched" between two flat armor sheets that are obliquity installed on the outer walls of the ACV and at a certain distance away from it. Such an "explosives sandwich" reacts upon impacting by the flying warhead—it explodes upon being hit by the flying warhead, wherein while the explosion occurs, it pushes one of the obliquity positioned flat armor sheets, to fly towards the penetrating jet's path that was simultaneously formed by the detonation of the warhead's hollow charge (that was also detonated upon impact on the explosive "tile"). The flat armor sheet, from the instant of its flight towards the penetrating jet formed by the hollow charge, forced the jet to cope, on its way to the external surface of the wall of the ACV which it is supposed (intended) to penetrate, with more and more material, and thus its efficiency is significantly reduced.

Some several years later, development of one more add-on type of armor has already started—the "active armor". These are integrated systems that include sensing means for detecting the warhead approaching the ACV (for example, armament equipped with a hollow charge at its warhead, or long hard metal penetrators of an anti tanks shell), and an array of charges (for example—an array of fragmentation charges, blasts charges, strikers or cutting charges), that are activated with accurate timing against the detected approaching threat and designed for active attack and eventually distraction of the approaching warhead or penetrator.

Traditionally and along the years, the tracked ACV's suspension system area was protected—if at all, by an additional armor means of the inert mechanical type, for example—by an additional protection known as "Bazooka Plates", namely—metallic pallets that were installed alongside the tracked ACV's suspension system. The already existing gap between the main body of the tracked ACV to the outer edge of its track (where the "Bazooka plate" has been hanged), and the fact that in any case, in there, the heavy wheels of the ACV's track are found, did as if ensured the disruption of the optimal detonation "Stand Off" distance of the approaching hollow charge type warhead and even posted at times, in front of the penetrating jet, rigid and hard obstacles to overcome (the tracked ACV's suspension system components that served as an additional barrier if they encounter the path route of the penetrating jet).

A dominant factor is that the region of tracked ACV's suspension system is exposed to the difficult conditions of the route followed by the ACV. Any professional in the automotive discipline would understand that hanging the add-on armor plates (e.g.—"Bazooka plate") alongside the tracked ACV's suspension system exposes the add-on armor means to vibrations and shocks. The tracked ACV's suspension system region and the add-on armor means hanged along are also exposed to frequent crashes with the ground and bumping into trees, bushes, stones, rocks and the like. The movements of the track might also throw mud, stones and small rocks into the gap between the added armor means and the tracked ACV's suspension system, in a manner so that it accumulates there and exert loads on the add-on armor means even as hard as bending it or plucking it away, causing detachment of the add-on armor means from the suspension on which it was suspended. Needless to say that more than just exposing the region of the tracked ACV's suspension system, as it happens from the instant that the add-on armor means was plucked away and detached, it is also to be remembered that the add-on armor means that was plucked away and detached— hence fell to the ground and left in the battle arena, might fall in the hands of the enemy and expose its secrets.

Hence, in recent years, in the tracked ACV's suspension system region, add-on armor means (e.g.—inert "Bazooka plates") were positioned on a damping suspension that included several elongated leaf springs that were positioned along the length and parallel to the tracked ACV's suspension system, to serve the task of damping vibrations and shocks unto which the add-on armor means is exposed. The elongated leaf springs enabled a certain degree of swinging, or—in other words—rocking movement of the add-on armor means relative to the tracked ACV's suspension system, and detachment of the lower end of the add-on armor means from the tracked ACV's suspension system in a manner that reduces the influence of impinging (hitting) the trees, bushes, stones, rocks and their likes and would reduce the danger of locking up mud and stones between the add-on armor means and the tracked ACV's suspension system.

During routine security measures of the USA armed forces in Iraq or of the IDF (Israeli Defense Forces) in the Gaza strip, in the course of the last several (recent) years, it became clear, that a tracked ACV might be exposed to a threat of attacks by roadside charges that are activated against it from a relatively short distance (for example—from a sidewalk wherein the ACV moves on the adjacent road along that sidewalk). These charges might be of the kind known as EFP (Explosively Formed Penetrator/Projectile). EFP is a charge formed as said—namely having essentially a dome like structure (shape) (in contra distinction to the conic shape that characterizes a "classic" hollow charge), that upon being detonated, forms and forges within the explosion occurrence—a metal penetrator (in contra distinction to the "red-hot" plasma jet that is generated by the "classic" hollow charge, as we have pointed above). A metal penetrator that forges, as said by the explosion, and as a result of the explosion is hurled in high velocity flight towards the ACV that traverses nearby, in many occasions—towards the inert "Bazooka Plates" that is meant to protect the tracked ACV's suspension system region, while hanging, for example, on the elongated leaf springs as we have explained above.

It has been found that against a penetrator that was generated and forged by the detonation of an EFP charge as said, it is not sufficient to implement solely an add-on armor means of the mechanical-inert type, but rather to disrupt the penetrator's flight by using additional and more advanced add-on armor means (for example—by an added armor means of the reactive or active types).

Concurrently, it was also found that the elongated leaf springs would not be fit or adequate to serve as damping means of the required heavier add-on armor means. The limitations inhibiting the use (for this purpose) of the leaf springs, arise from—

The inability of the leaf springs to carry the added weight of the required more advanced add-on armor means. The configuration of said leaf springs as such, limits their dynamic movement upwards-downwards, encountering a state of closing the gaps between the leaves from the instant an overload state developed while losing their damping capabilities; and—

The excess sensitivity of the more advanced add-on armor means to vibrations and shocks (for example—the relatively high sensitivity of the explosives used as an integral part of the reactive and active add-on armor means). While on the other end, the leaf springs as such, are relatively rigid and limited in their capability to convert multi-directional twists unto a rather uni-directional smooth swinging movement, a movement that from the dynamic point of view, occurs in the leaf springs while going over between extreme states (e.g.—up-down), in a manner such that it strongly hurls the add-on armor means that is coupled to the leaf springs and causes it to sustain additional and superfluous shocks.

The absence of a mechanism that would be able to be integrated with the elongated springs structure and that would enable easy shifting of the added armor means (that now, as said, must inherently be heavier) from its place—in order to enable a convenient access to the tracked ACV's suspension system region as is required in order to execute required service of the system (for example—servicing the ACV's track).

Thus, in the eve of the evolving of invention, which is the subject matter of the patent application submitted herein, as for the field of systems providing add-on armor means to ACV's, there actually existed a true need for an improved damping suspension that— a. Would enable damping vibrations and shocks, unto which a relative heavy add-on armor means of the type, highly sensitive by its design to such vibrations and shocks (as for example—the aforementioned reactive or active armor), will be subjected from the instant it is installed on the tracked ACV's flanks (sides), in order to protect the tracked ACV's suspension system's region.

b. Would impart to the add-on armor means with a multi directional, continuously swinging capability which will be relative smooth, in a manner that it would protect the armor means from the mishaps of the roads and would prevent the accumulation and locking up of mud, dirt and stones between it and the ACV's side wall.

c. Would be of a relatively rigid construction so that it would enable to reliably secure the add-on armor means—to prevent it from being plucked away and detached from its place and thus (if not achieved) would expose the ACV and even to the danger of the detached armor falling in the hands of the enemy who might divulge its secrets.

d. Its installation should be easy and swift, should not require superfluous structural (or complicated) changes in the ACV carrying it and will not leave openings through which the approaching arms might penetrate, namely—it should cover well a maximum area using the add-on armor means.

e. would include a mechanism that would enable shifting the added armor means at ease from its place in order to enable a convenient access to the tracked ACV's suspension system region as is required in order to execute required service of the system (for example—servicing the ACV's track).

SUMMARY OF THE INVENTION

The present invention, the subject matter of this patent application, meets the requirements we have pointed at above, by presenting a damping suspension that—as usual, it also includes means for mounting the protecting system unto the ACV and a damping means that is coupled to the mounting means and to the protecting means in order to damp and contain vibrations and shocks which the protecting means might generally encounter as an outcome of the ACV's travel. However— in accordance with the invention—the subject matter of this patent application, the damping suspension is characterized by that that the damping suspension contains a device of the wire rope vibration isolator type. In other words— specifically implementing a device of the wire rope isolator genre, aimed at the specific need to damp vibrations and shocks unto which in general, an add-on armor means to an ACV might be exposed as said, and an add-on armor to the tracked ACV's suspension system region in particular, constitute a characteristic feature of at least one preferred embodiment of the invention.

As would be elaborated herein after, while referring to the accompanying drawings, a damping suspension in accordance with the present invention, is rather easily installable on and adaptable to a wide variety of ACV's, without having to restore to executing superfluous constructional changes for the sake of its mounting and harnessing it on them (namely—on various types of ACV's).

Thus for example, in one preferred embodiment of the invention, the damping suspension is mounted to an ACV by utilizing threads that already exist on it, and in a manner that saves time and costs.

The advantages of a device of the wire rope isolator type for damping and restraining vibrations and shocks (by comparison to the elongated leaf springs) necessarily reflect on a state of exerting reduced strain on the mounting means of the add-on armor to the ACV, and hence, in certain given configurations, it is sufficient, as said, to harness the system to the ACV by connecting unto threaded brackets that already exist on it from earlier instances.

Implementing said wire rope isolator device in accordance with the invention, does not require the forming of exposed and unprotected "air gap". The device is amenable to be assembled in the system while maintaining overlap, or at most—a minimal gap, between the add-on armor modules.

A damping suspension in accordance with the present invention would also not add undesired sensitivity or fragility to the mechanical rigidity that, as a rule—is mandatory for any added protection system of ACV's.

A damping suspension in accordance with the invention, does not necessitates special maintenance and it enables its disassembly and assembly anew by the field echelon (combat men—such as the ACV crew) in a manner that enables them to continue the routine of servicing the ACV without having to seek help from the rank above them (for said disassembly and assembly anew).

In yet another preferred embodiment of the present invention, the damping suspension system includes also means for up lifting the added armor means, such that from the instant of its connection enables the crew (team) personnel to lift up manually the added armor means system (that is relatively heavy) and to position it in its elevated (raised) state—and thus enable the crew personnel to obtain a convenient access to the tracked ACV's suspension system means as is required for enabling them to service the system (for example, servicing the ACV's tracks).

Characteristic feature of the means for up lifting the added armor system is its being based on a manually operated mechanism (namely, one that does not require external power means for actuating and operating it).

In a preferred embodiment of the invention, the manually operated mechanism is based on a lift up hinge means of the type that includes a series array of springy disks.

In accordance with this preferred embodiment of the present invention, plurality of this type of lift up hinge means are positioned in a permanent manner on the side and adjacent to the damping suspension, and constitute an integral part of the added armor system of the tracked ACV's. In accordance with need when it arises (for example, when it becomes necessary to service the ACV's tracks), it is possible to connect said lift up hinge means unto the damping suspension system in a manner that enables to lift up the suspension manually (and on it there are mounted modules of the relatively heavy added armor means for protecting the tracked ACV's suspension region), so that convenient access to the tracked ACV's suspension system region as is required in order to execute required service of the system is enabled.

BRIEF DESCRIPTION OF THE ACCOMPANYING DRAWINGS

The present invention will be described hereinafter in conjunction with the accompanying figures. Identical components, wherein some of them are presented in the same figure—or in case that a same component appears in several figures, will carry an identical number.

FIG. 1 constitutes an illustration—presented in a perspective view, of an example of a damping suspension device in accordance with the present invention, installed with an add-on armor system on it.

Figure 2:
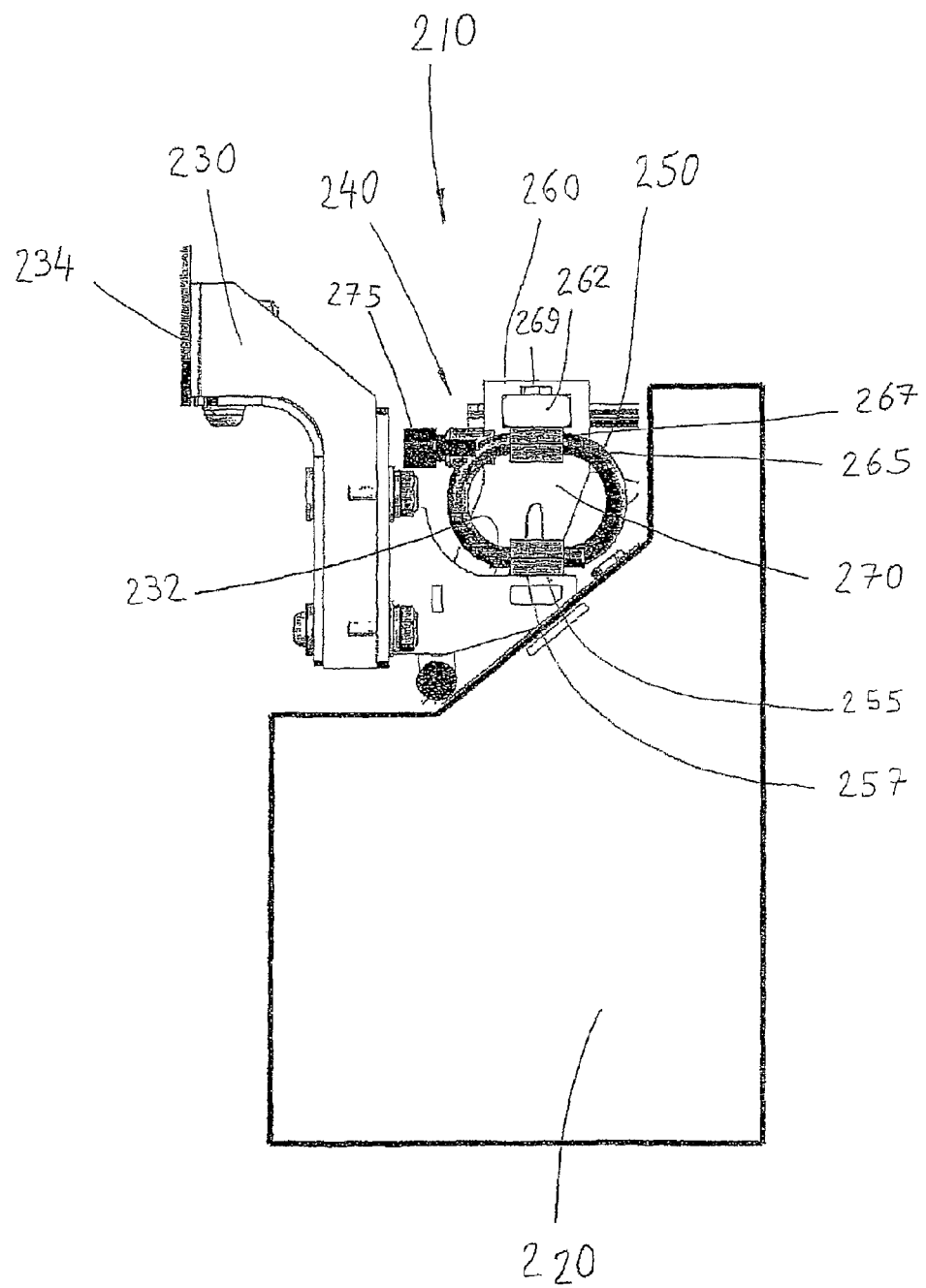

FIG. 2 constitutes a side view of an example damping suspension—in accordance with the present invention, installed with an add-on armor system on it.

Figure 3:
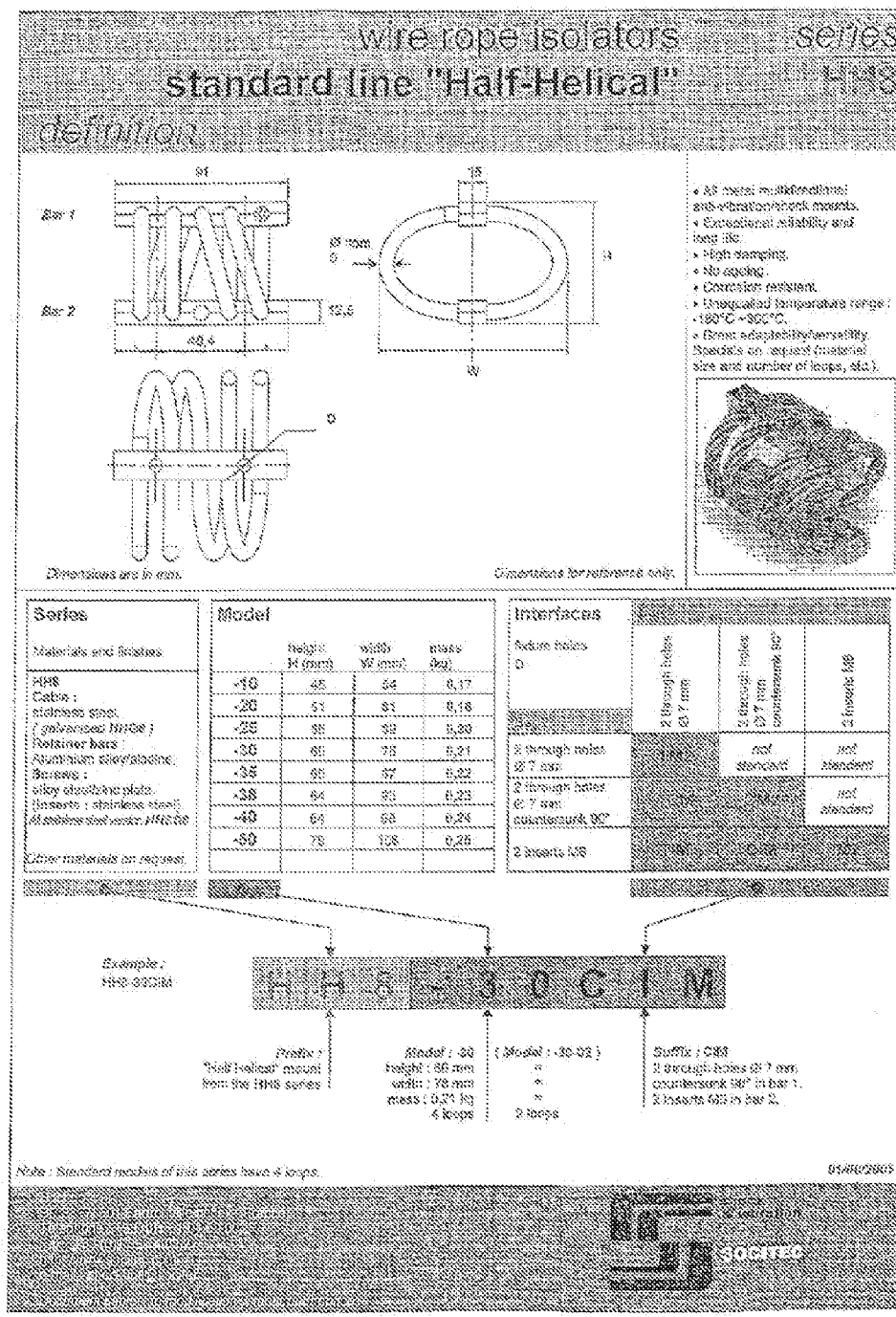

FIG. 3 constitutes a commercial technical print out, presenting an example device of the wire rope isolator type that is implementable in a damping suspension in accordance with the present invention.

Figure 4:
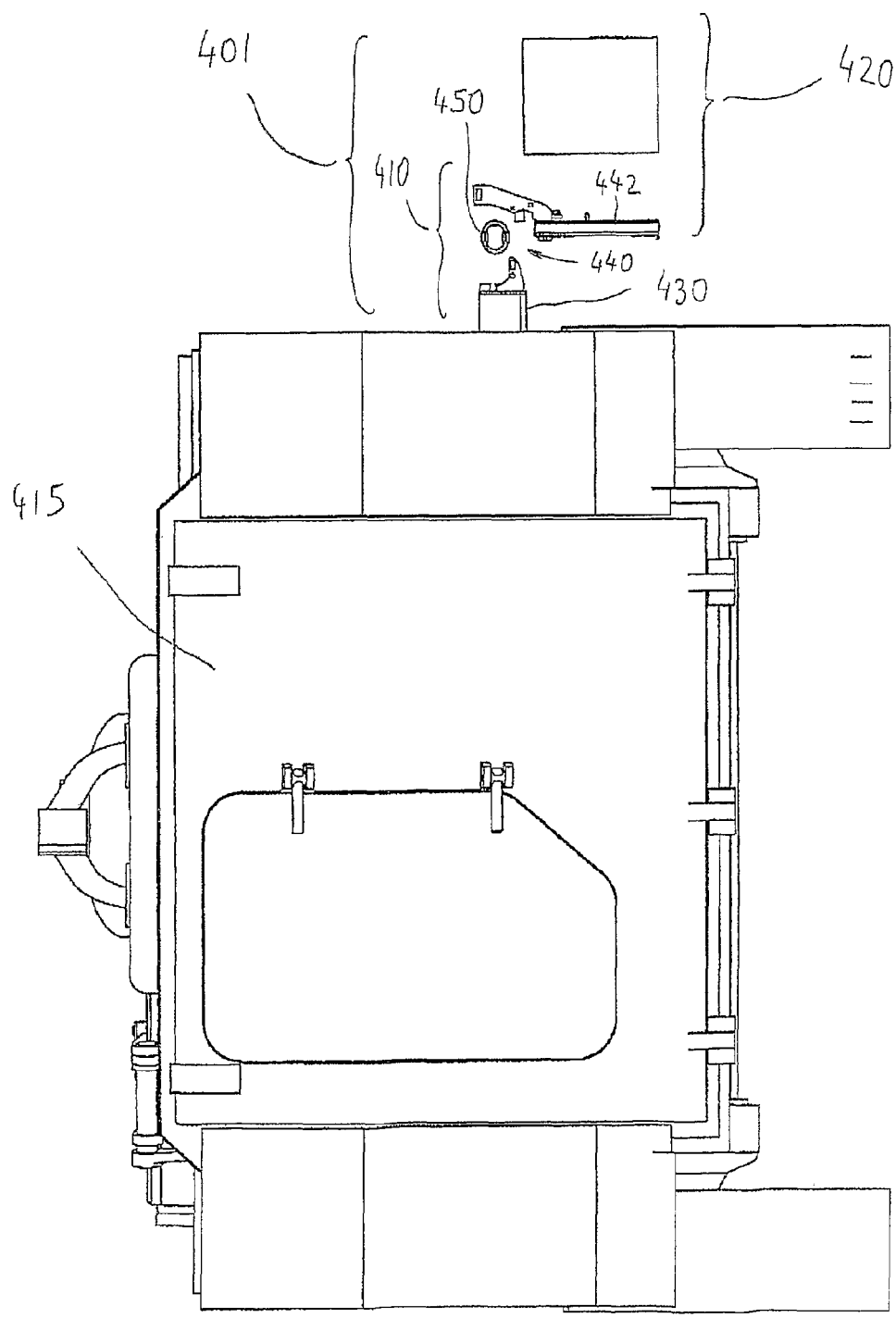
Figure 5:
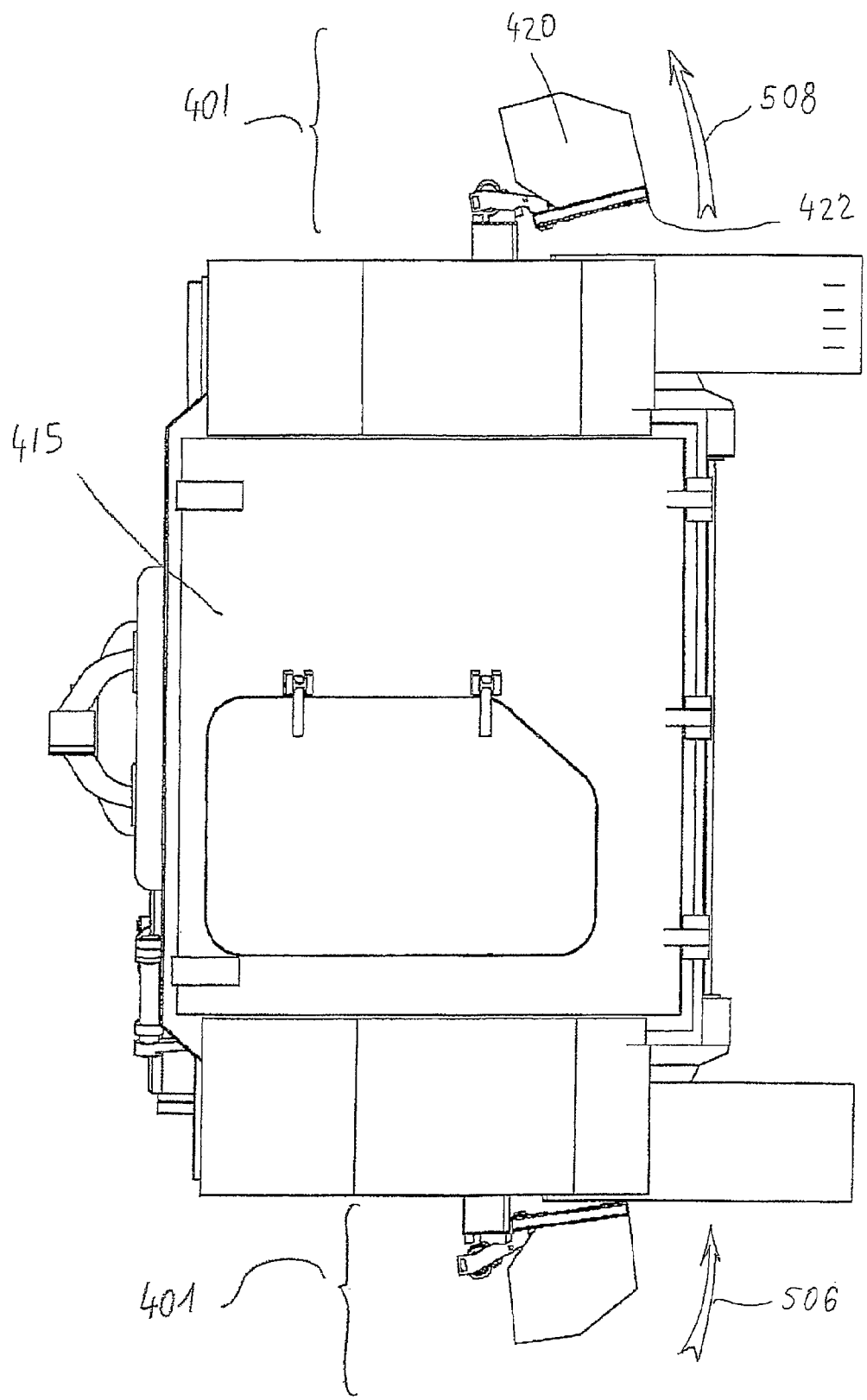

FIGS. 4 and 5 constitute illustrations of an add-on armor means for an ACV (in the illustrated example—armored troop carrier M-113) that includes add-on armor means and a damping suspension in accordance with the invention, presented in by an exploded view and in a "swing states" respectively—on one flank of the ACV, in the direction of the tracked ACV's suspension system, and on the other flank of the ACV—while the lower end of the add-on armor means is swing away from the tracked ACV's suspension system.

Figure 6:
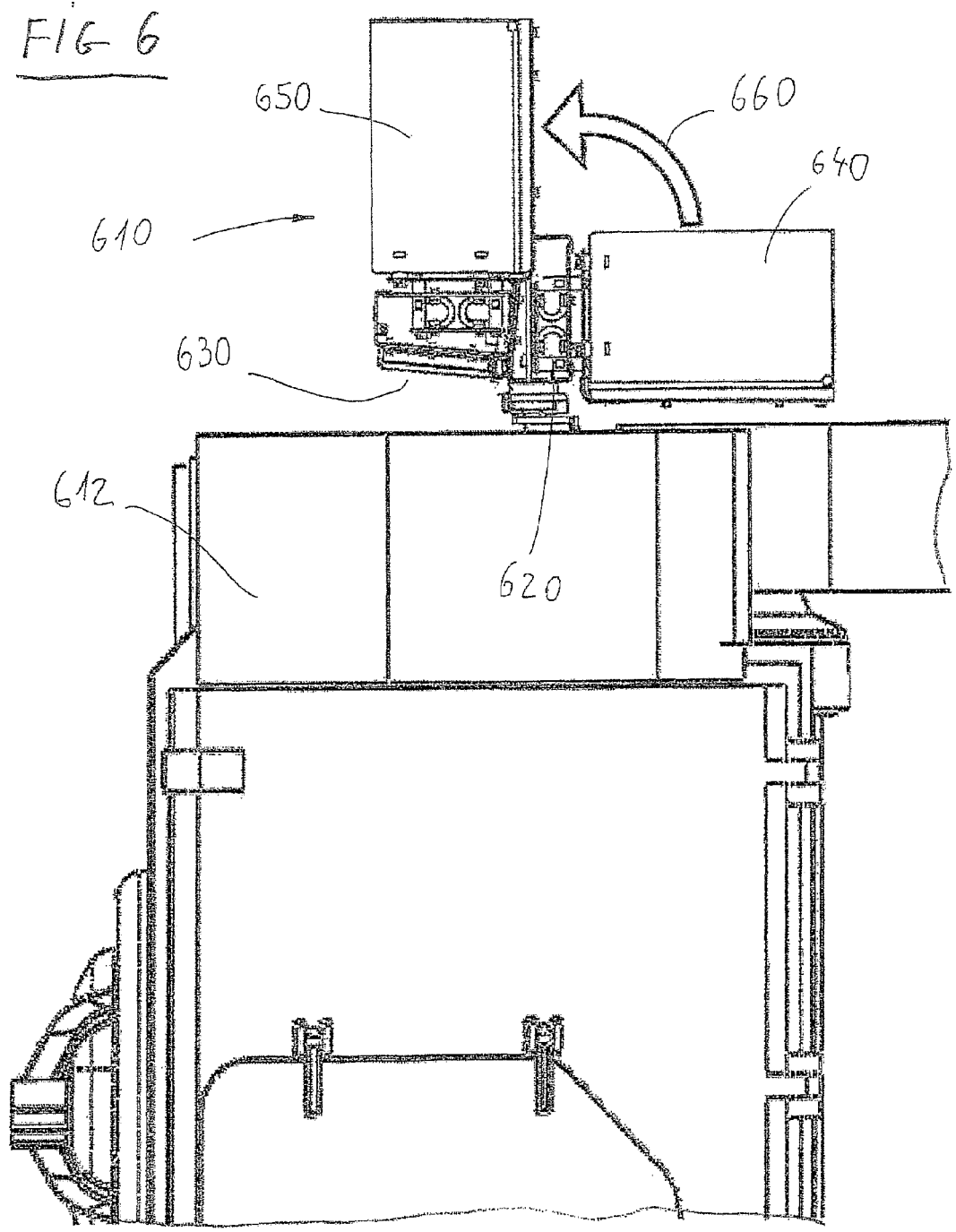

FIG. 6 constitute an illustration of an add-on armor means for an ACV that is mounted on an additional configuration of a damping suspension in accordance with the present invention, wherein the suspension is integrated with means for lifting up said add on armor means. In the illustrated example—the armor means, the damping suspension and the lift up means are illustrated in a rear view of the side of an armored troop carrier M-113, wherein one add-on armor module is found in a regular state while a second module has been lifted up (in the direction of the arrow), to the state of servicing the track.

Figure 7:
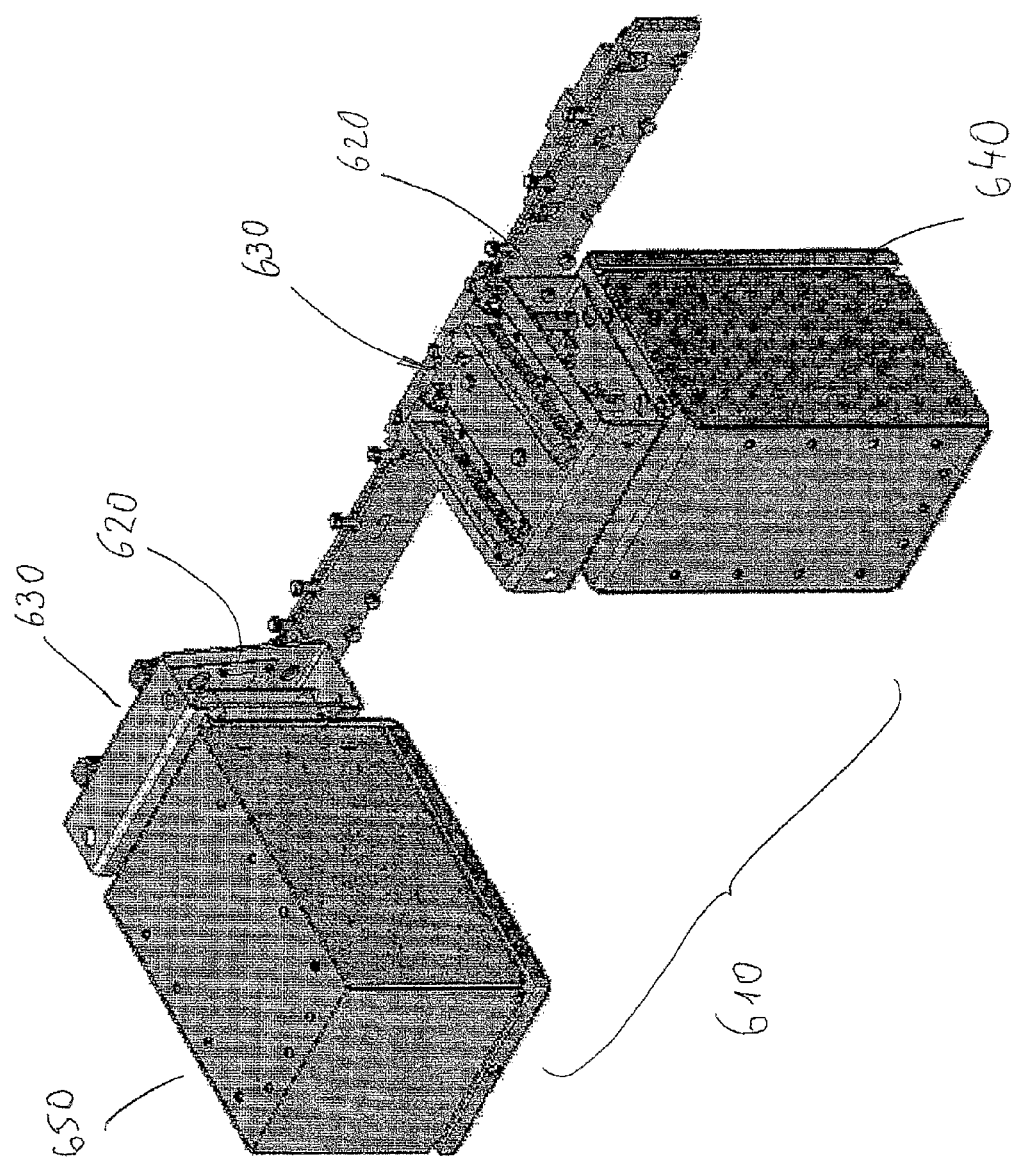

FIG. 7 constitutes an illustration—presented in a perspective view, of an example of the added armor means for a tracked ACV that is mounted on the additional configuration of a damping suspension system in accordance with the invention, wherein the suspension is integrated with means for lifting up of the added armor (as it was illustrated also in FIG. 6).

Figure 8:
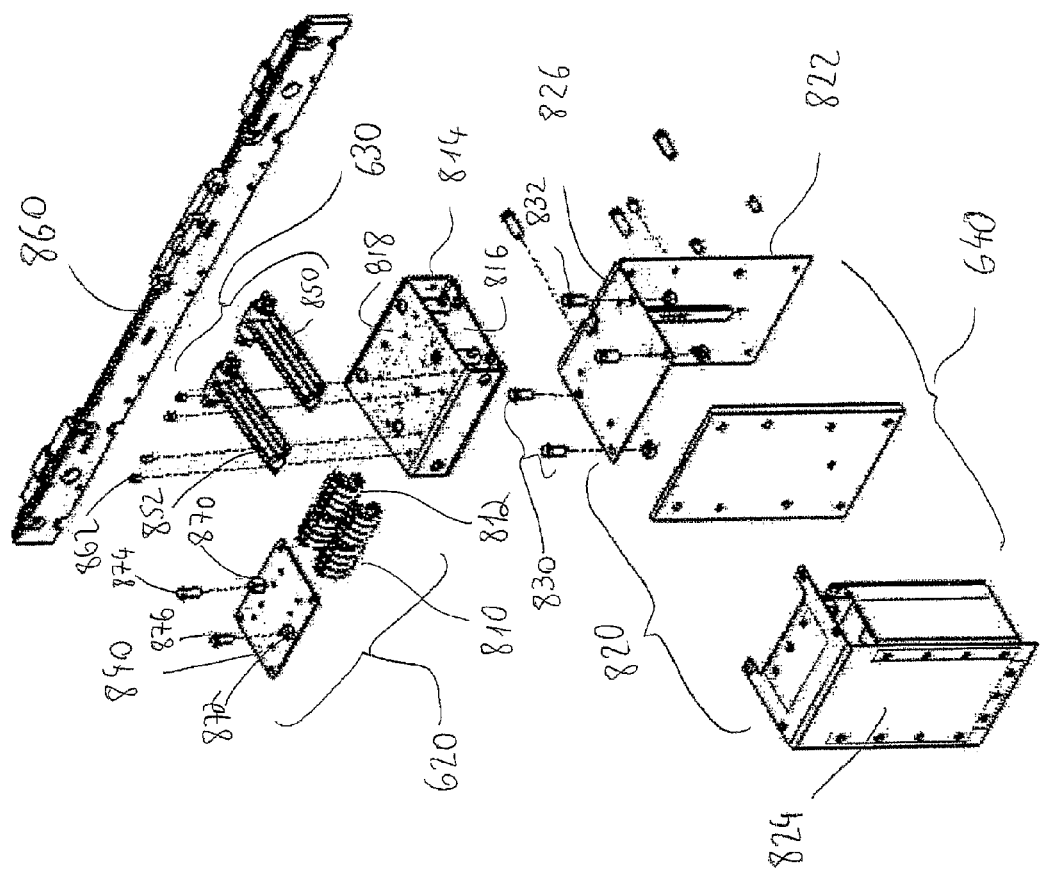

FIG. 8 constitutes an exploded view illustration of the components of the added armor means, the damping suspension and the lift up hinge means that were illustrated in FIGS. 6 and 7.

FIG. 9 constitutes a close view illustrating the components of the damping suspension means and the lift up hinge means that were illustrated in FIGS. 6 to 8.

FIG. 10 constitutes a commercial technical printout that presents an example of a lift up hinge means of the type that includes a series array of springy disks, which are a characterized feature of the up lift hinge means that was illustrated in FIGS. 6 to 9.

Figure 11:
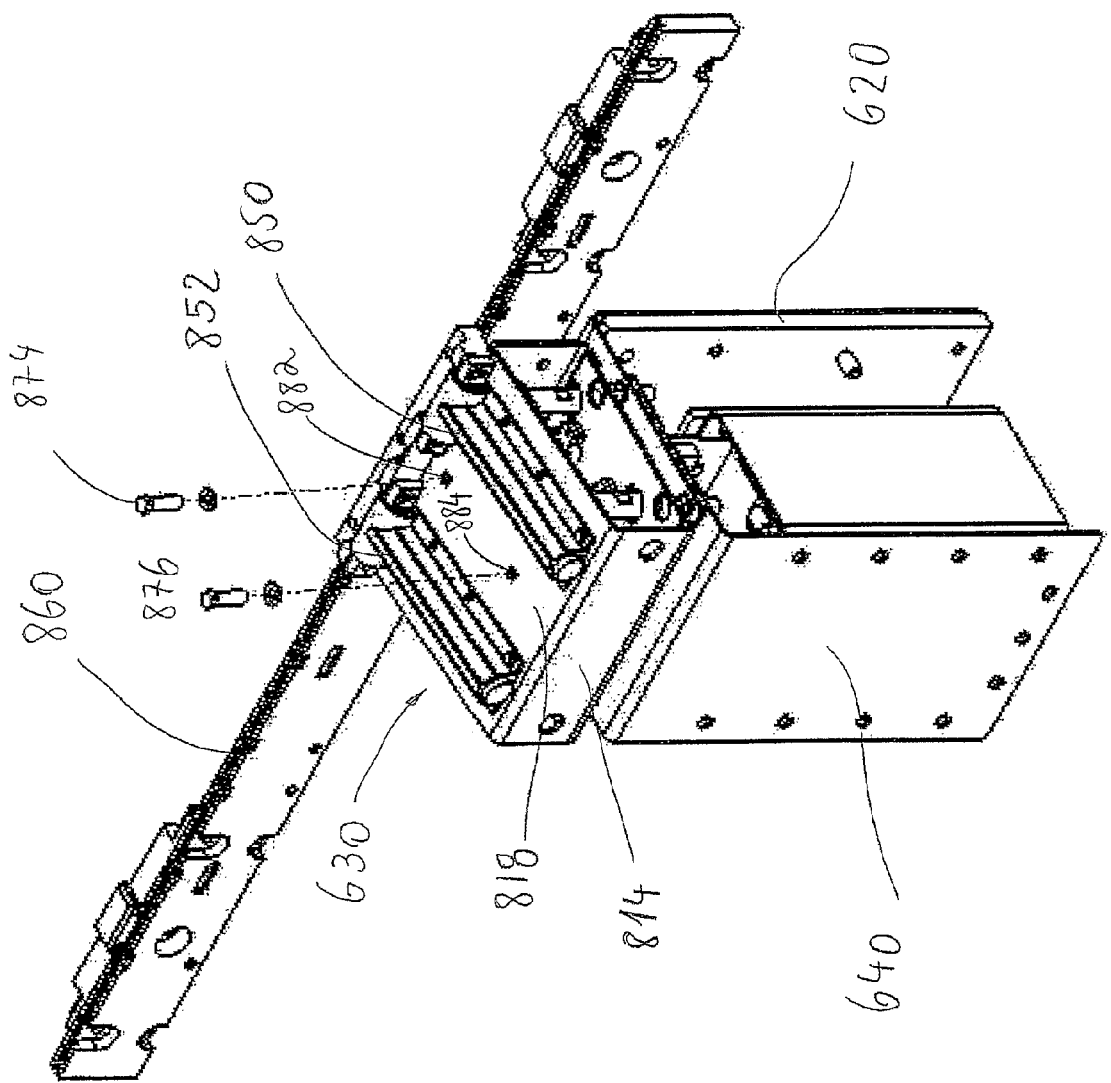

FIG. 11 constitutes an illustration—presented in a perspective view, of the manner used for integrating the lift up hinge means with the damping suspension (upon which there is illustrated an add on armor module), while depicted prior to lifting up of the damping suspension and the add on armor module.

Figure 12:
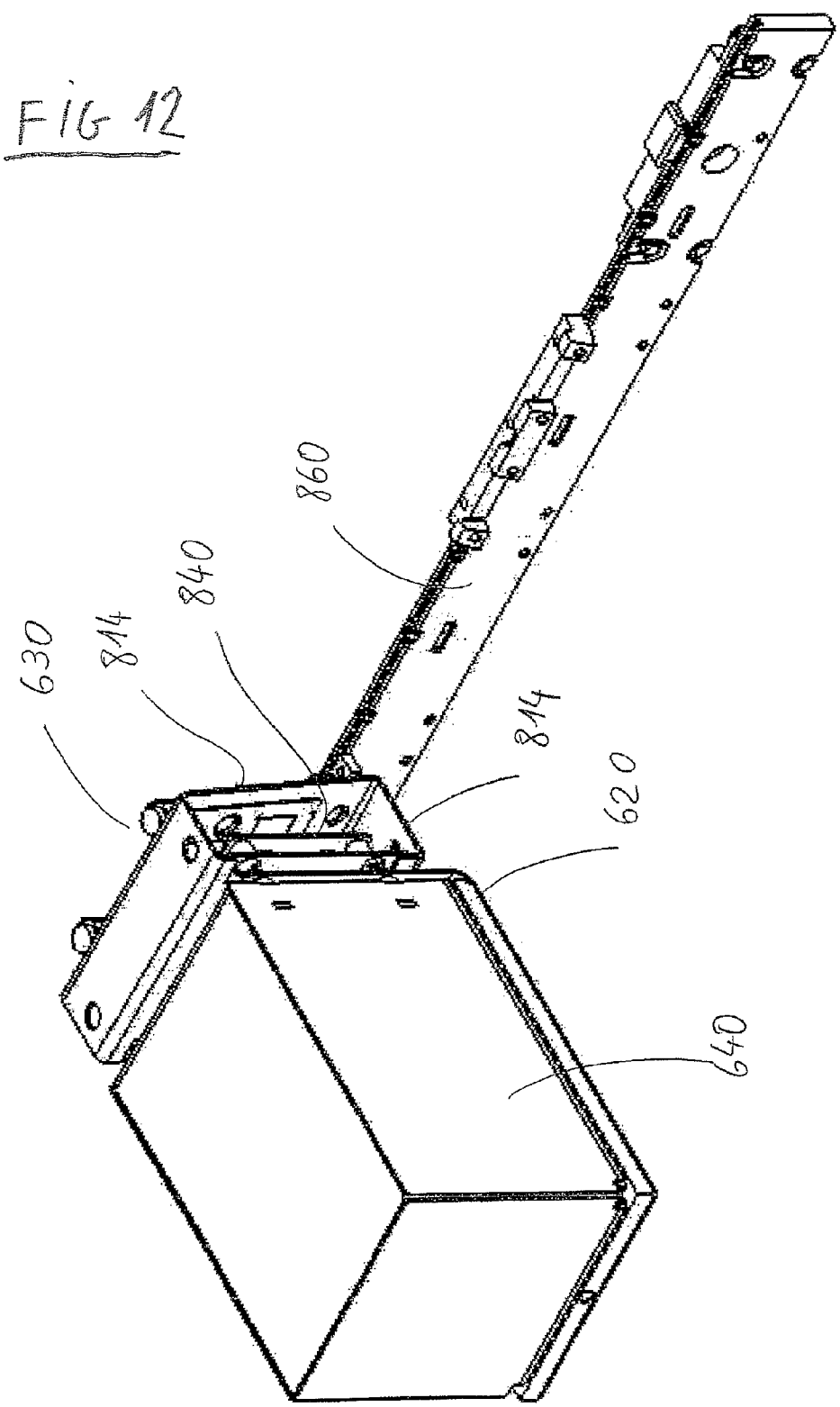

FIG. 12 constitutes an illustration—presented in a perspective view, of the state of lifting up the damping suspension and the add on armor module that were illustrated in FIG. 11.

Figure 13:
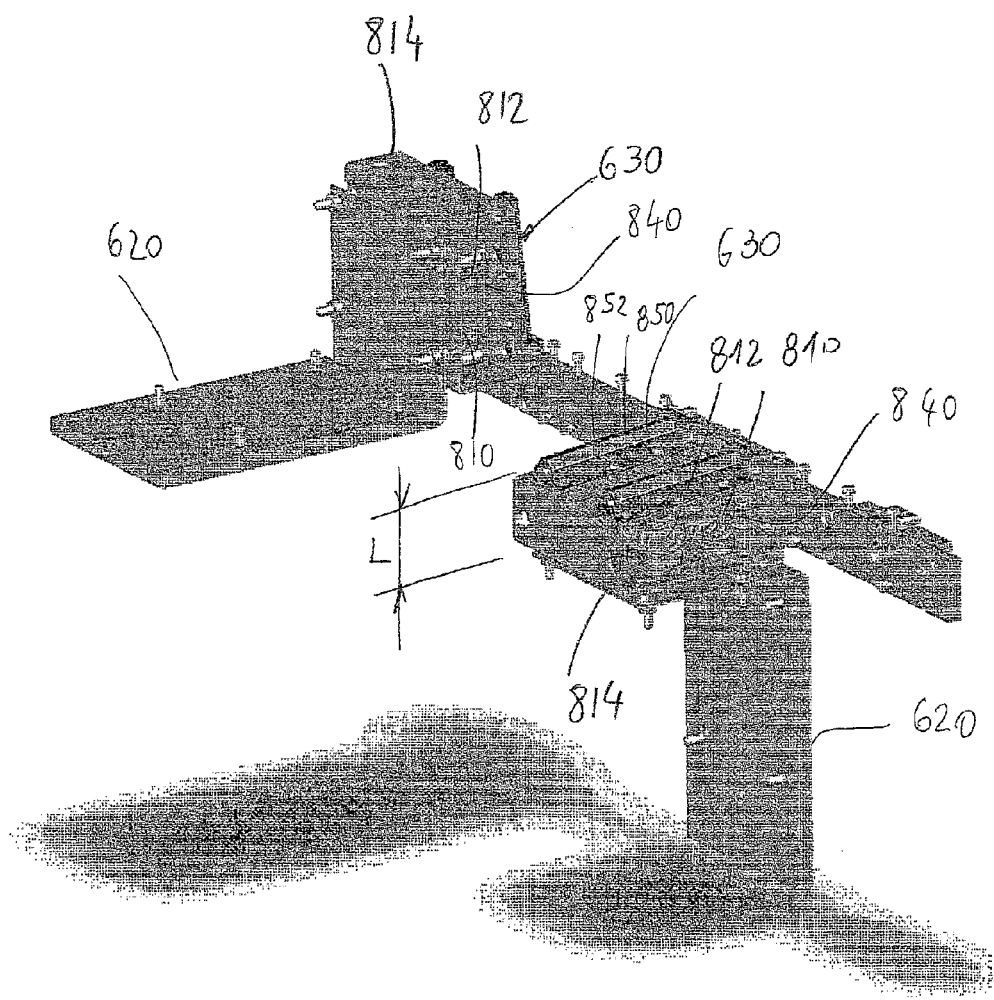
Figure 14:
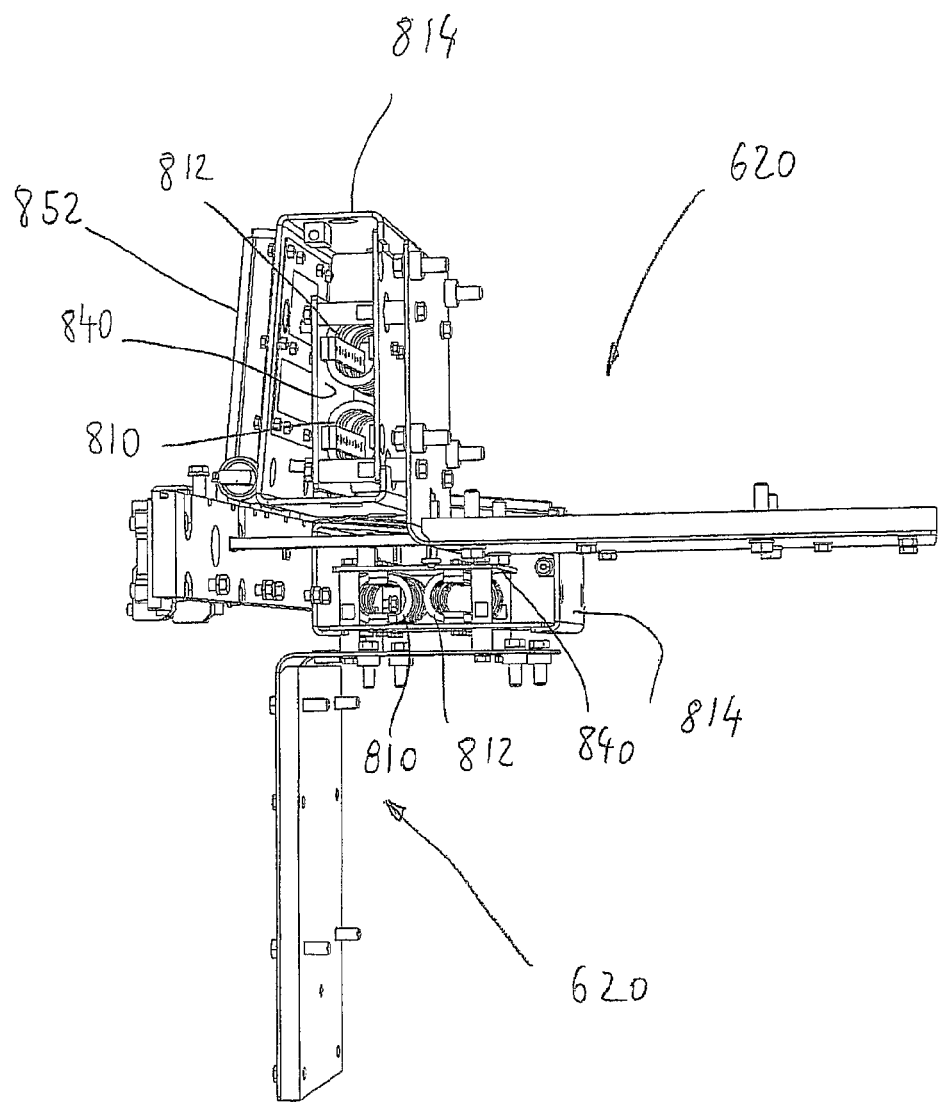
Figure 15:
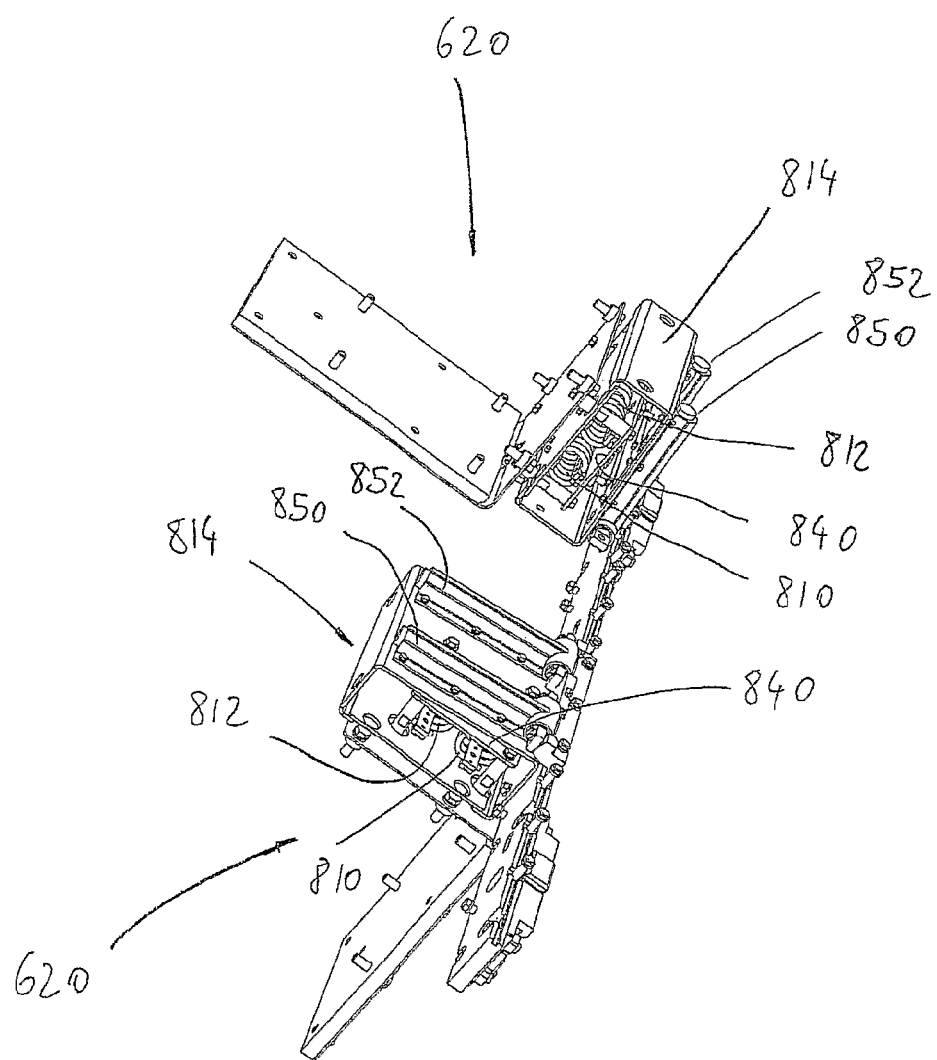

FIGS. 13 to 15, constitutes illustrations—presented in perspective views (at different angles), of two damping suspensions in accordance with the invention (in this illustration without an added armor means mounted on them), integrated—each one of them—with a lift up hinge means (in accordance with the preferred embodiment of the invention as it was illustrated in FIGS. 6 to 12), wherein one is found in the lifted up state while the other one is in its regular state.

DETAILED DESCRIPTION OF A PREFERRED EMBODIMENT OF THE INVENTION

Reference is being made to FIGS. 1 to 3. FIG. 1 constitutes an illustration (presented in a perspective view) rendering an example damping suspension 10 in accordance with the present invention, wherein an add-on armor system 20 is installed on the damping suspension.

FIG. 2 constitutes a side view of an example damping suspension 210 in accordance with the invention, wherein add-on armor means 220 is installed on it. FIG. 3 constitutes a commercial technical print out, presenting an example of wire rope isolators 50 and 250 that are implantable in damping means 40 and 240, respectfully, and are installed in damping suspensions 10 and 210, respectively.

The invention that is the subject matter of this application, is meant to and intended for a specific implementation in an add-on armor means of an ACV (that is not illustrated in the above quoted figures, that includes means for protection (note that characteristic sectors of add-on armor means are schematically illustrated and labeled 20 in FIG. 1 and 220 in FIG. 2).

Any professional experienced in this field would understand that the add-on armor means might be of the inert type (for example homogenous "Bazooka plates" or multi layered armor, wherein they might be made of different materials) and/or of the reactive type (wherein they might be bulk modules included with multi layered assemblages, tilted into an angle, of combinations of inert sheets with layers of explosive materials), and/or of the active type (for example—fragmentation charges, strikers, or cutting charges that are intended for actively attacking the approaching warhead or penetrator) and/or various combinations of armor means as per the above classifications, that would be pre-assembled together into modules that will be mounted on the innovative suspension.

The invention—the subject matter of this application, constitutes a damping suspension (labeled 10 in FIG. 1 and 210 in FIG. 2).

Damping suspensions 10 and 210, contain mounting means (denoted 230 in FIG. 2 and is not illustrated in FIG. 1) for harnessing the armor system unto an ACV. In the example illustrated in FIG. 2, means 230 is formed as a kind of a "tray" 232 with a side wall 234 that might be harnessed unto the side wall of the ACV (for example by screws that are connected into existing threaded brackets that existed beforehand on the ACV's side wall).

Any professional experienced in this field would understand that mounting means for harnessing the armor system to an ACV might be manufactured as discrete units that might be positioned (i.e., as said, by screws), along and parallel to the whole upper edge of the tracked ACV's suspension system, wherein—at times, there already are found suitable threaded brackets that regularly serve, for example, to accomplish a rigid anchorage of the mechanical-inert "Bazooka Plates", or of a mud preventing shield.

Damping suspensions 10 and 210, include in addition, also damping means (denoted 40 in FIG. 1 and 240 in FIG. 2, respectively). The damping means is coupled to, on the one side, the above mentioned mounting means (see damping means 240 in FIG. 2—coupled to "tray" 232) and on its other side, couple to the add-on armor means (20 and 220).

Any professional would understand that the purpose of the damping means is to damp vibrations and shocks unto which the add-on armor means might be exposed to, as a result from the ACV's movements. Damping means as said, might be positioned along and parallel to the whole length of the upper edge of tracked ACV's suspension system region, wherein they are coupled as said, concurrently to the mounting means on the one end side and to the add-on armor means on the other end.

A characteristic feature of a damping suspension in accordance with present invention is that damping means 40 and 240 include a device of the wire rope isolator type (such two devices are illustrated in FIG. 1, as they are mounted in tandem—one next to the other and each of them denoted 50. One such device is illustrated in FIG. 2 and denoted 250.

Devices of the wire rope isolator type are manufacture and marketed by—for example, the French company SOCITEC (located at 11/13 rue D'estienne D'orves 78500 Sartrouville, whose internet site can be found at: http://www.socitec.com/vente-amortisseur-gb.html Devices of the wire rope isolator type are described also in patent's documentation of the cited company (Socitec) and of other companies—for example:
U.S. Pat. Nos. 5,897,093, 6,290,217, 6,406,011, EP 0059143.

Any professional experienced in this field would understand that in this kind of devices, the effect of springiness (elasticity) is achieved by the built in elasticity (springiness) from the instant of bending a wound metal cable with plurality of wires and strands unto forming a ring shape. The damping effect is gained through the relative friction that is generated between the wires of the cables themselves, and between the strands of the cables.

Relying on an all metal construction, namely—devoid of elastomeric components and the like, that naturally are sensitive to fuels and oil saturated environmental conditions as that of an ACV and additionally exposed to the sun radiation, devices of the wire rope isolator type, provide for multi directional damping capability of vibrations and absorbing shocks.

The devices are durable even in harsh environmental conditions; they are tough and have a relatively long life time cycle. Devices of this kind, additionally, do not succumb to ageing or to creeping phenomena.

Concurrently, devices of this type enable adaptation to—and coupling with—regular available connecting means (for example—screws) to a diverse assemblage of different brackets.

FIG. 3, constitutes, as said, a commercial technical printout, presenting an example device of the wire rope isolators type 50 and 250, made by the above mentioned French company Socitec, in which use is made in damping means 40 and 240 that are installed in a damping suspension 10 and 210, respectively. However, any professional would understand that equivalent and similar devices, might be manufactured and marketed, as said, also by various other companies.

Likewise, devices of the wire rope isolators type 50 and 250, were illustrated as of the helical structure type, but any experienced professional in this field would understand that, a device as cited—might as well be selected from a larger group of equivalent or similar devices of this type, for example—half helical, polycal and axycal and asymmetric types or be designed as any combination thereof.

In the illustrated examples presented in FIG. 1 and FIG. 2, each one of the devices of the wire rope isolator type 50 and 250, are coupled, on the one side (see in FIG. 2), by a couple of brackets 255 and 257 that are fastened together one to the other and While confining between them the cable component of the wire rope isolator device, and harnessed to "tray" 232, by an array of screws (that is not illustrated), and on the other hand (the other side), the wire rope isolator device is coupled to the add-on armor means 20 and 220, respectively. In the illustrated examples presented in FIG. 1 and FIG. 2, the coupling to the add-on armor means is provided by a structure means 60 (two are illustrated in tandem one next to the other in FIG. 1) and 260, respectively. Structure means 60 and structure means 260 comprise upper beams 62 and 262 respectively, unto which the wire rope isolator type of device is harnessed, respectively (see in FIG. 2)—a pair of brackets 265 and 267 that are fastened one to the other while confining the cable component of the device between them, and harnessed to an upper beam 262 by an array of screws 269, and see in FIG. 1—a couple of brackets 65 and 67 that are fastened together one to the other and while confining the cable component of the device between them and harnessed to upper beam 262 by a screws array 69.

Structure means 60 and 260 are formed with side arms (70 and 270 respectively) that extend on both sides of each of the aforementioned upper arms, wherein they are connected unto them and affixed unto the add-on armor means 20 and 220. Structure means 60 and 260 also include movement limiting means (75 and 275, respectively), for example—adjustable screws, elastomeric brackets and so on, that limit and brake the swinging movements of the add-on armor modules one relative to the other (in order to prevent mutual hit and crushing of the neighboring add-on armor modules (that are not illustrated).

Any professional would understand that connections, links, affixing steps and movements limitations, might as well be affected by many other and varied different means.

Let's refer to FIGS. 4 and 5. FIGS. 4 and 5 (respectively), constitute illustrations of an add-on armor system 401 for an ACV (in the illustrated example—armored troop carrier M-113), whose rear view was illustrated and labeled 415, and the system is illustrated in FIG. 4, wherein it is installed solely on its one side flank, and in FIG. 5—shown as it is installed on both sides of the ACV. Add-on armor system 401 is illustrated wherein it includes add-on armor means 420 and damping suspension 410 in accordance with the present invention. In FIG. 4—the system is illustrated in an exploded view while in FIG. 5—in a "swing" position towards the tracked ACV's suspension system (note the direction of the arrow 506) and in swing, as said, while the bottom end 422 of the add-on armor means 420 is distancing away from the tracked ACV's suspension system (note the direction of the arrow 508).

The damping suspension 410, includes—mounting means 430 for harnessing the protection system to the ACV, and damping means 440 that is linked to mounting means 430 and to add-on armor means 420 (in accordance with the means and the principles we appointed at when referring to FIG. 1 and FIG. 2,), for damping vibrations and absorbing shocks unto which the add-on armor means might be exposed as a result from the ACV's ride.

In accordance with a characteristic feature of the present invention—also damping means 440 includes a device 450 of the wire rope isolator type.

Any professional in the field would understand that add-on armor means 420 constitute means for protecting the tracked ACV's suspension system region and therefore, damping suspension 410 provides a multi-directional "swing" movement of armor means 420 relative to the ACV's suspension system (see "swing" in FIG. 5) in the direction of the tracked ACV's suspension system and note the direction of arrow 506, and while the lower end 422 of add-on armor means 420 is distancing away from the tracked ACV's suspension system, in the direction of arrow 508.

Furthermore, any professional would understand that in the illustrated example, add-on armor means 420 (for example—reactive type of armor), is added and installed while overlapping an additional add-on armor means 442 that in the illustrated example, is installed and labeled as a part of damping means 440. Therefore, damping suspension 410 might serve for damped and restrained carrying as said, for a variety of combinations of add-on armor means.

In an additional preferred configuration of the present invention a damping suspension in accordance with the invention is amenable to be integrated with a mechanism that would enable a easy shifting of the added armor means from its location, in order to enable convenient (and easy) access to the tracked ACV's suspension system as required for doing maintenance or service operations of the system (for example—service to the ACV's track).

Reference is being made to FIG. 6. FIG. 6 constitutes an illustration of an add-on armor means 610 for an ACV 612 that is mounted (installed) on an additional embodiment of damping suspension 620 in accordance with the invention—wherein suspension 620 is integrated with means 630 for lifting up add on armor means 610.

In the illustrated example, add-on armor means 610, suspension 620 and lift up means 630 are illustrated wherein they are installed on the side of an M-113 type of ACV (in a view from the rear), wherein one armor module 640 is found in its regular state, whereas the other module—650, was lifted up (in the direction of the arrow 660) to enable servicing the track.

Let's refer to FIG. 7. FIG. 7 constitutes an illustration—presented in a perspective view, of an example of the added armor means 610 for a tracked ACV that is mounted on the additional embodiment of a damping suspension 620 in accordance with the invention, wherein the suspension is integrated with a means 630 for lifting up the added armor system (two modules are illustrated, numbered 640 and 650, respectively, the first one being in its regular state and the second one shown in the lifted up state).

Any professional would understand that equipment of this kind—add on armor, damping suspension and lift up means, might also be installed next to another ACV type for protecting its tracks region, and that the added armor means might comprise a large number of modules, located in an array one next to the other, wherein to each one of them or to several of them forming a group, there is assigned a damping suspension means and a lift up means—and that the illustration showing only two modules, is solely presented as an example.

Reference is being made to FIGS. 8 and 9. FIG. 8 constitutes an exploded view illustration of the components of added armor means 610, suspension 620 and lift up means 630 (wherein for the demonstration, we will refer only to one module—640). FIG. 9 constitutes a close view illustrating the components of damping suspension means 620 and lift up means 630 that were illustrated in FIGS. 6 to 8.

As it was described above, when referring to FIGS. 1 to 5, damping suspension 620 too is characterized by that that it incorporates devices of the wire rope isolator type, wherein two of them 810 and 812 respectively, are illustrated in FIGS. 8 and 9.

In the illustrated example, devices 810 and 812 are suited to be installed inside housing assembly 814, that is formed (for example—from steel or aluminum sheets), as a kind of a hollow box having a bottom surface 816 and a upper (top) surface 818 and is open on its other two sides.

As was already described above when referring to FIGS. 1 and 2, also each one of the two wire rope isolator devices 810 and 812 include an array of two pairs of brackets that are fastened one to the other, and as will be described below, actually enable harnessing the wire rope isolator device for example—by bolts (that are not illustrated), on the one side to the added armor module 640 (whose vibrations it is supposed to suppress), and on its other side to housing assembly 814 that serves as its base.

In the illustrated example, added armor module 640 is depicted as a combination of several types of armor. The armoring variety is not a part of the present invention—hence they are not assigned par numbers. They may constitute a combination, for example, of an inert armor plate with reactive armor. The added armor is positioned within the sort of a box 820. In the illustrated example, box 820 is formed from two assemblies—822 and 824 that are manufactured, for example, from steel plates, aluminum sheets or composite materials, and are fastened one to the other—for example by an array of screws.

An array 830 of protruding bushings is positioned on the top (upper) surface 826 of box 820 (an array of four identical bushings 832 is depicted in the illustrated example).

Upon mounting of added armor module 640 under housing assembly 814, bushings 832 are suited in their dimensions to a free (non-hindered) passage through matching openings 834 that are formed in the lower (bottom) surface 816 of housing assembly 814. These openings—834, are large enough to enable free motion of bushings 832 upwards and downwards, and also, in a limited extents—sideways and along (forming) an angle.

From the time that bushings 832 are positioned inside the hollow space of housing assembly 814, bushings 832 are connected to carrying means 840 (for example—by bolts that are not illustrated) wherein this carrying means 840 is located inside the hollow space of housing assembly 814.

Carrying means 840 that, in the illustrated example is depicted as being formed as a flat rectangular beam, is located on top of wire rope isolator devices 810 and 812. Carrying means 840 is affixed unto wire rope isolator devices 810 and 812 with bolts (that are not illustrated), that are screwed into the brackets as cited earlier, wherein the brackets encompass the multi strands cable from which each of the wire rope isolators is made.

Therefore, carrying means 840 is affixed to wire rope isolators 810 and 812 on their upper side, wherein the bottom (lower) side of wire rope isolators 810 and 812 are affixed by bolts (that are not illustrated)—that are screwed into the brackets that encompass the lower side of the multi strands cable, and unto the bottom surface 816 of housing assembly 814.

Thus, in this configuration, each one of wire rope isolators devices 810 and 812 is harnessed on its one side, to added armor means module 640 whose vibration it is supposed abate (contain), and on its other side—to housing assembly 814 that serves as it base.

As said, this specific preferred embodiment of the present invention is integrally combined with lift up means 630 for lifting up the of the added armor means. In accordance with the illustrated embodiment, means 630 for lifting up the of the added armor means is a manually operatable mechanism that relies on two lift up hinge means 850 and 852 that are from the kind that includes a series array of springy disks.

Let's refer to FIG. 10. FIG. 10 constitutes a techno-commercial printout that presents an example of a lift up hinge means of the type that includes a series array of springy disks—on which, as said, lift up means 630 is based.

Such lift up hinge means, are offered for sale, for example by the company Profil-Import AB from Ormbergsvägen 16•S-117 67 Stockholm Sweden—and are advertised by the company in the following two links: http://www.profil-import.se/ and—http://www.profil-import.se/liftup.pdf This is a hinge and spring device materialized in one unit and made of a material requiring no maintenance. The spring-construction consists of a number of disc springs that are grouped to give the required force. The disc springs "work" against an especially formed axle, providing two designated positions: the first one for when the lift up flap is closed and the second one being in the open position. Such a lift-up hinge means is made in a very robust construction and it is mounted on the outer top of the flap to be lifted.

Concerning the matter of the illustrated example, two lift up hinge means 850 and 852 are assigned to lift up add on armor module 640, but any professional in this field would understand that in other feasible configurations it is possible to designate different and other quantity of such means for the task of lifting up an add on armor module.

Each one of the two lift up hinge means 850 and 852, respectively, is pivotally anchored on its one end to adapter means 860 and affixed along its entire length unto the external surface area of the top surface 818 of housing assembly 814 (that constitutes—for our concern in this matter, the outer top of the flap to be lifted).

Any professional would understand that that above cited anchoring and affixing operations might be conducted while utilizing for these purposes various and different means, for example with screws (such as screws 862 that are intended to affix the opposing ends of each of the two lift up hinge means 850 and 852 unto the external surface area of top surface 818).

Any professional would also understand that adapter means 860, which—in the illustrated example is formed as an elongated beam that adapts and connects between the ACV (by getting connected, as an example—to the threaded brackets that are already in existence along the side lengths of the ACV), and the lift up means 630 (by pivotally anchoring each one of the lift up hinge means) that is connected to the damped suspension and to the added armor means that is installed on it, is only an example, and that a damping suspension in accordance with the invention might be coupled to the carrying ACV flanks by adapter means that are different from the depicted elongated beam shaped example.

Let's refer to FIG. 11. FIG. 11 constitutes an illustration—presented in a perspective view, of the manner used for integrating lift up means 630 with damping suspension 620 (the one that upon which there is illustrated an add on armor module 640 mounted) prior to lifting up the damping suspension and the add on module.

Lifting up the damping suspension and the add on armor module together—as one single rigid unit, dictate the anchoring of wire rope isolators 810 and 812 to the flap to be lifted up, namely—to housing assembly 814. For that end, if we revert to FIGS. 8 and 9 in the illustrated example, carrying means 840 is formed with two threaded brackets 870 and 872 that are adapted to be connected with bolts 874 and 876, respectively.

Let's revert to FIG. 11. From the instant wherein it is desired to lift up the damping suspension and the add on armor module, bolts 874 and 876 are inserted via pass through openings 882 and 884 (that are formed in the external surface area of the top surface 818 of housing assembly 814) and screwed into threaded brackets 870 and 872 (see FIGS. 8 and 9).

Thus it is possible to fasten carrying means 840 that is rigidly connected (by bushings 832)—to box 820 (and inside it there was inserted the added armor means module), to housing assembly 814. Fastening carrying means 840 to housing assembly 814 actually cancels the damped "floating" ability of damped suspension 620, as it was achieved by wire rope isolators 810 and 812. Fastening carrying means 840 to housing assembly 814 ruggedizes (toughens) the system and actually adds the structure of suspension 620 and add on armor module 640 unto the flap to be lifted by using lift up means 630 (combining the suspension and the armor module unto housing assembly 814).

Any professional would understand that fastening and ruggedizing as said, of the suspension and the armor module unto housing assembly 814, might also be achieved by other means than the couple of bolts 874 and 876 that are illustrated solely as an example (for example—implementing a different number of screws or utilizing a moveable excenter mechanism for fastening and canceling those degrees of freedom between the suspension and the armor module and housing assembly 814.

Let's refer to FIG. 12. FIG. 12 constitutes an illustration—presented in a perspective view, of the state of lifting up damping suspension 620 and add on armor module 640 that were illustrated in FIG. 11, subject to that this lifting up is executed after fastening carrying means 840 unto housing assembly 814—as was described when referring to FIG. 11.

Any professional would understand that it is possible to secure the up lifted damping suspension 620 and the add on armor module 640 when they are in this up lifted state, by applying additional securing means (that are not illustrated) such as a releasable safety pin, one or more, that affixes housing assembly 814 unto adapter means 860.

Any professional would also understand that—for example, following the maintenance of the ACV's tracks, the crew (team) of the ACV can restore easily the damping suspension and the add on armor module to their regular state (i.e., hanging alongside the ACV's tracks region), and that from the instant of releasing the couple of bolts 874 and 876 from threaded brackets 870 and 872 (see where reference is made to FIG. 11), damping suspension 620 is manually revertable to its regular state—namely provides anew the damping properties that are imparted by its "floating" characteristic over wire rope isolators devices 810 and 812.

Reference is being made to FIGS. 13 to 15. FIGS. 13 to 15 constitutes illustrations—presented in perspective views (at different angles), of two damping suspensions 620 in accordance with the invention (in this case—illustrated without an added armor modules mounted on them), integrated—each one of them—with a lift up means 630 (in accordance with the preferred embodiment of the invention as it was illustrated in FIGS. 6 to 12), wherein one is found in the lifted up state while the other one is in its regular state.

Any professional, experienced in the add-on armor field, would appreciate the fact that the lift up means 630 is compact in its construction and dimensions and particularly in its height dimension (see dimension L in FIG. 13), in a manner that does not leave large gaps (spaces) that are not covered (namely—that are not protected) by an add on armor modules and thus would and thus would have been relatively vulnerable. Moreover as the all-mechanical and rigid structure of housing assembly 814, the wire rope isolators devices 810 and 812, carrying means 840 and lift up hinge means 850 and 852 add—by their inherent structure properties and their geometric location (namely—protruding laterally outwards and positioned at a distance from the side walls of the ACV), contributes additional armoring and protection capabilities.

Any professional experienced in the field of operating ACVs, would appreciate the fact that means 630 (the lift up means for lifting up the add on armor system) does not require—for its activation nor its operation, any external power source, so that the ACV crew, them by themselves and with using simple (common) work tools that are in their possession (e.g., a wrench), can—within the regular maintenance chores that are their duties, operate the lift up means, and this in a manner that provides them with an easy and convenient access to the tracked ACV's suspension system region, as required by their routine servicing and maintenance ACV's duties.

Thus, to recapitulate, the present invention enables damping the vibrations and absorbing shocks that heavy and relatively sensitive add-on armor means are anticipated to encounter and be exposed to (for example—reactive armor), upon being mounted on the flanks of a tracked ACV for protecting the tracked ACV's suspension system region, and while providing multi directional, smooth swinging capability, in a manner that would prevent the accumulation and locking up of mud, dirt and stones between the add-on armor modules and the ACV's side wall.

In an additional preferred embodiment of the present invention, the damping suspension includes also means for lifting up the added armor means—such that from the instant of connecting it, it enables the ACV's crew to manually lift up the relatively heavy add on armor system, and to position it at its elevated (i.e. up lifted) state, and thus the crew obtains convenient and easy access to the tracked ACV's suspension system region—as required for executing routine (and otherwise) servicing and maintenance of the system (for example, treating the ACV's tracks).

Any professional would understand that the present invention was described above while referring to the accompanying figures, only in a way of presenting examples, and that in other add-on armor means to ACV's there might be manufactured and installed various damping suspensions while introducing changes and additions that would not depart from the constructional characteristics of the invention (the subject matter of this application), that is defined by the following claims herein under—

The invention claimed is:
1. A damping suspension for an add-on armor system for protecting a region of a suspension system of an ACV (Armored Combat Vehicle), comprising:
  a mounting means for mounting the add-on armor system to the ACV;
  a damping means coupled to the mounting means and to armor means of the add-on armor system to dampen vibrations and restrain shock which the armor means might be exposed to during travel and use of the ACV the damping means further comprising:
- a housing assembly that is formed as a hollow box with a top surface and a bottom surface and is open on two sides, and
- a wire rope isolator device installed inside the housing assembly; and
- a lift up means coupled to the damping means and further comprising a first end pivotally connected to the ACV and a second end connected to the top surface of the housing assembly to manually lift up the armor means, wherein the lift up means comprises at least one lift up hinge means that includes a series array of springy disks.

2. The damping suspension of claim 1, wherein the ACV comprises a tracked ACV having a suspension system including a track, springs and sprocket wheels; and the armor means protects a region of the tracked ACV's suspension system; and
the wire rope isolator device enables the armor means to move in a swinging motion relative to the ACV's suspension system region, while the lower end of the armor means moves away from the ACV's suspension system region.

3. The damping suspension of claim 2, wherein the armor means is an add-on armor module selected from the group consisting of: inert, reactive and active armor or any combination thereof.

4. The damping suspension of claim 1, wherein the wire rope isolator device is selected from the group consisting of: a helical, half helical, polycal and axycal device or any combination thereof.

5. The damping suspension of claim 1, wherein the top of the flap to be lifted is connected to at least one wire rope isolator device of the wire rope isolator through a releasable connection to a carrying means that is connected to both the add-on armor system's armor means, as well as to at least one device of the wire rope isolator.

6. A damping suspension for an add-on armor system for protecting a region of a suspension system of an ACV (Armored Combat Vehicle), comprising:
- a mounting device for mounting the add-on armor system to an ACV;
- a damping apparatus coupled to the mounting device and to an armor cover of the add-on armor system to dampen vibrations and restrain shock which the armor cover might be exposed to during travel and use of the ACV; the damping apparatus further comprising:
  - a housing assembly that is formed as a hollow box with a top surface and a bottom surface and is open on two sides, and wherein the damping suspension includes a wire rope isolator device installed in the housing assembly; and
- a lift up means comprising a first end coupled to the mounting device and a second end coupled to the damping apparatus, wherein the lift up means comprises at least one lift up hinge means that includes a series array of springy disks configured to manually lift up the add-on armor system.

7. The damping suspension of claim 6, wherein the ACV comprises a tracked ACV having a suspension system including a track, springs and sprocket wheels; and the armor cover protects a region of the tracked ACV's suspension system.

8. The damping suspension of claim 6, wherein the wire rope isolator device enables the armor cover to move in a swinging motion relative to the ACV's suspension system region, while the lower end of the armor cover moves away from the ACV's suspension system region.

9. The damping suspension of claim 7, wherein the wire rope isolator device is selected from the group consisting of: a helical, half helical, polycal and axycal device or any combination thereof.

10. A method of protecting a region of an ACV's suspension system during use, the method comprising attaching a damping suspension to an ACV to cover a region of the ACV's suspension system, the damping suspension comprising a mounting means for mounting the add-on armor system to an ACV; and a damping means coupled to the mounting means and to armor means of the add-on armor system to dampen vibrations and restrain shock which armor means might be exposed to during travel and use of the ACV; wherein the damping suspension further comprising:
- a housing assembly that is formed as a hollow box with a top surface and a bottom surface and is open on two sides, and wherein the damping suspension includes a wire rope isolator device installed in the housing assembly; and
- a lift up means coupled to the damping means and further comprising a first end pivotally connected to the ACV and a second end connected to the top surface of the housing assembly to manually lift up the armor means, wherein the lift up means comprises at least one lift up hinge means that includes a series array of springy disks.

11. The damping suspension of claim 6, wherein the lift up hinge means has at least two ends, one end being pivotally connected to the ACV and the other end being connected to an outer top of a flap to be lifted; wherein the outer top of the flap to be lifted is connectable to the damping suspension.

12. The damping suspension of claim 11, wherein the outer top of the flap to be lifted is a housing assembly that is formed of a hollow box with a top surface and a bottom surface and wherein it is open on two sides, and at least one wire rope isolator device is installed inside the housing assembly allowing the add-on armor means to be attached to the housing assembly.

* * * * *